United States Patent
Kawamura et al.

(10) Patent No.: US 9,284,982 B2
(45) Date of Patent: Mar. 15, 2016

(54) CAGE AND ROLLING BEARING

(75) Inventors: Mitsuo Kawamura, Kuwana (JP); Eiichiro Shimazu, Kuwana (JP); Yasutake Hayakawa, Kuwana (JP); Takahiro Okuno, Kuwana (JP); Junichi Ooshimo, Hiroshima (JP); Ryuichi Sakamoto, Hiroshima (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/583,915

(22) PCT Filed: Mar. 9, 2011

(86) PCT No.: PCT/JP2011/055466
§ 371 (c)(1),
(2), (4) Date: Sep. 10, 2012

(87) PCT Pub. No.: WO2011/111729
PCT Pub. Date: Sep. 15, 2011

(65) Prior Publication Data
US 2013/0004112 A1    Jan. 3, 2013

(30) Foreign Application Priority Data

Mar. 10, 2010 (JP) .................. 2010-052756
Apr. 19, 2010 (JP) .................. 2010-095864
Apr. 19, 2010 (JP) .................. 2010-095865

(51) Int. Cl.
*F16C 33/44* (2006.01)
*F16C 33/54* (2006.01)
*F16C 33/41* (2006.01)

(52) U.S. Cl.
CPC .............. *F16C 33/414* (2013.01); *F16C 33/44* (2013.01); *F16C 33/445* (2013.01); *F16C 2204/26* (2013.01); *F16C 2220/04* (2013.01)

(58) Field of Classification Search
CPC .. F16C 33/385; F16C 33/414; F16C 33/4629; F16C 33/497; F16C 2204/26; F16C 2223/70
USPC .......... 384/527, 531, 572, 573; 164/113, 131, 164/303, 312, 900; 148/406, 420, 666
See application file for complete search history.

(56) References Cited

U.S. PATENT DOCUMENTS 5,482,385 A * 1/1996 Yokota et al. .............. 384/572
5,948,340 A   9/1999 Terada et al.
(Continued)

FOREIGN PATENT DOCUMENTS

| CN | 1269475 A | 10/2000 |
| CN | 1542164 A | 11/2004 |

(Continued)

OTHER PUBLICATIONS

Machine translation of JP 2000-213544 A obtained on Jul. 29, 2014.*
(Continued)

*Primary Examiner* — Adam D Rogers
(74) *Attorney, Agent, or Firm* — McDermott Will & Emery LLP

(57) ABSTRACT

A cage is made of a magnesium alloy such as AZ91D, and is molded by means of injection molding. In this cage, a confluence region is brought away to outside the cage during the injection molding. The confluence region is a region including a void formed by merging of flows of the magnesium alloy. When observing a cross sectional surface of the cage, a ratio of an α phase having a grain size of 20 μm or greater is less than 15% in the magnesium alloy constituting the cage.

19 Claims, 21 Drawing Sheets

(56) References Cited

U.S. PATENT DOCUMENTS

| | | | |
|---|---|---|---|
| 6,572,270 B2 * | 6/2003 | Murakami et al. | 384/476 |
| 7,101,088 B2 * | 9/2006 | Yamamoto et al. | 384/470 |
| 8,765,032 B2 * | 7/2014 | Auffahrt et al. | 264/29.1 |
| 2011/0069917 A1 | 3/2011 | Yamada et al. | |
| 2012/0039558 A1 | 2/2012 | Shimazu et al. | |
| 2012/0183248 A1 * | 7/2012 | Fujiwara et al. | 384/527 |

FOREIGN PATENT DOCUMENTS

| | | |
|---|---|---|
| CN | 1737212 A | 2/2006 |
| JP | 55-137198 A | 10/1980 |
| JP | 59-107223 U | 7/1984 |
| JP | 64-079419 A | 3/1989 |
| JP | 6-313434 A | 11/1994 |
| JP | 8-103840 A | 4/1996 |
| JP | 10-318263 A | 12/1998 |
| JP | 2000-213544 A | 8/2000 |
| JP | 2004-074270 A | 3/2004 |
| JP | 2004-286063 A | 10/2004 |
| JP | 2005-127493 A | 5/2005 |
| JP | 2005-140269 A | 6/2005 |
| JP | 2005-163997 A | 6/2005 |
| JP | 2006-300294 A | 11/2006 |
| JP | 2007-078118 A | 3/2007 |
| WO | WO-2009/144785 A1 | 12/2009 |
| WO | WO-2010/095647 A1 | 8/2010 |

OTHER PUBLICATIONS

Machine translation of JP 2004-286063 A obtained on Jul. 29, 2014.*
International Search Report issued in International Application No. PCT/JP2011/055466 issued on Apr. 12, 2011.
Japanese Office Action issued in Japanese Application No. 2010-095864 dated Mar. 4, 2014, w/English translation.
Japanese Office Action issued in Japanese Application No. 2010-095865 dated Mar. 4, 2014, w/English translation.

* cited by examiner

CAGE AND ROLLING BEARING

RELATED APPLICATIONS

This application is the U.S. National Phase under 35 U.S.C. §371 of International Application No. PCT/JP2011/055466, filed on Mar. 9, 2011, which in turn claims the benefit of Japanese Application Nos. 2010-052756 filed on Mar. 10, 2010, 2010-095864 filed on Apr. 19, 2010 and 2010-095865 filed on Apr. 19, 2010 the disclosures of which Applications are incorporated by reference herein.)

TECHNICAL FIELD

The present invention relates to a cage and a rolling bearing.

BACKGROUND ART

As a cage for holding a rolling element of a rolling bearing, a metal cage made of steel or brass may be used. The metal cage is excellent in strength but results in high cost when being processed into a complicated shape disadvantageously. Further, the raw material thereof has a large specific gravity to result in a large mass. Accordingly, such a metal cage is unfavorable for bearings for high-speed rotation applications or transportation equipment applications, which require reduced weight, disadvantageously.

In contrast, cages made of resin have been known. Such cages can be molded readily and achieve reduced weight. Further, there have been proposed cages each made of a resin fiber-reinforced by incorporating a fiber into the resin (for example, see Japanese Patent Laying-Open No. 2005-127493 (Patent Literature 1), Japanese Patent Laying-Open No. 2005-140269 (Patent Literature 2), Japanese Patent Laying-Open No. 2005-163997 (Patent Literature 3), and Japanese Patent Laying-Open No. 2007-78118 (Patent Literature 4)). These make it possible to provide a cage that can be processed into a desired shape at low cost and achieves reduced weight while securing a certain level of strength.

For applications requiring a higher strength while achieving reduced weight, it has been also proposed that a cage manufactured by semi-molten molding of a magnesium alloy is applicable. Accordingly, there can be provided a cage suitable for high-speed rotation because of its excellent moldability, high strength, and light weight (for example, see Japanese Patent Laying-Open No. 2000-213544 (Patent Literature 5)).

Further, there are an iron plate cage, and a fiber-reinforced resin cage employing an engineering plastic or a super engineering plastic as its matrix. Examples of the engineering plastic and the super engineering plastic include a nylon (polyamide; PA) resin, a polyphenylene sulfide (PPS) resin, a polyetheretherketone (PEEK) resin, and the like. (For example, see Japanese Patent Laying-Open No. 64-79419 (Patent Literature 6)).

Because the iron plate cage and the brass cage are made of metals, they are excellent in strength. However, since the iron plate cage is mainly manufactured by means of press processing, it is difficult to manufacture a cage having a three-dimensionally complicated shape. In addition, assembly thereof is also complicated because two components need to be connected to each other (for example, see Japanese Patent Laying-Open No. 8-103840 (Patent Literature 7)). When economically manufacturing the brass cage, the brass cage is usually formed into a simple machined shape. Hence, both the iron plate cage and the brass cage have restrictions in terms of their shapes that can be industrially manufactured. These cages are larger in specific gravity and therefore heavier than a resin cage. Hence, they are not much suitable for applications under high-speed rotation, which require light weight (for example, see Patent Literature 1). Accordingly, resin cages have begun to be used for rolling bearings for main shafts of machine tools required to attain high-speed rotation, for example. Further, under an intermittent operation, energy is lost in proportion to the mass of a cage during acceleration and deceleration. Hence, it is desired that the cage has a light weight also when it is used for a business machine and a moving medium such as a vehicle, both of which strongly require energy saving.

CITATION LIST

Patent Literature

PTL 1: Japanese Patent Laying-Open No. 2005-127493
PTL 2: Japanese Patent Laying-Open No. 2005-140269
PTL 3: Japanese Patent Laying-Open No. 2005-163997
PTL 4: Japanese Patent Laying-Open No. 2007-78118
PTL 5: Japanese Patent Laying-Open No. 2000-213544
PTL 6: Japanese Patent Laying-Open No. 64-79419
PTL 7: Japanese Patent Laying-Open No. 8-103840, FIGS. 1 (C), (D)
PTL 8: Japanese Patent Laying-Open No. 55-137198

SUMMARY OF INVENTION

Technical Problem

The cage made of resin is generally molded by means of injection molding. In order to secure desired strength, such a cage made of resin is likely to be provided with a reinforcement material having a large aspect ratio such as a fiber. This raises problems in anisotropy in mold shrinkage amount and machine characteristics, which results from flow orientation. Further, in a weld portion formed during the injection molding, the longitudinal side of the reinforcement material tends to be arranged along the weld line. Accordingly, the effect of reinforcement by the reinforcement material does not extend to the weld portion. This makes it difficult to secure strength in the weld portion, disadvantageously.

On the other hand, in the cage made of magnesium alloy, the reinforcement material having a large aspect ratio is not usually used. Hence, the problem in anisotropy, caused by providing the reinforcement material, does not take place. However, when actually molding a cage made of magnesium alloy by means of injection molding, high strength and fatigue characteristics, which should have been attained in the first place, cannot be attained sufficiently.

In view of these, an object of the present invention is to provide a cage made of a magnesium alloy and having a light weight and a high strength, and a rolling bearing including the cage.

Further, in the case where the magnesium alloy is applied to a crown-shaped cage 200 having a conventional shape as shown in FIG. 33A and FIG. 33B, the magnesium alloy, which is a brittle material inferior to a resin material in terms of deformation resistance, provides a difficulty in manufacturing through injection molding because it involves a so-called "forcibly removed portion", which is inevitably deformed during extraction from the mold.

Accordingly, another object of the present invention is to provide a rolling bearing and its crown-shaped cage having a strength higher than that of the resin material, allowing for injection molding, and facilitating insertion of a rolling element during assembly of the bearing.

Solution to Problem

A cage according to the present invention is a cage holding a rolling element in a rolling bearing. The cage is made of a magnesium alloy, and is molded by injection molding. A confluence region is brought away to outside the cage during the injection molding, the confluence region being a region including a void formed by merging of flows of the magnesium alloy including a liquid phase. When observing a cross sectional surface of the cage, a ratio of an α phase having a grain size of 20 μm or greater is less than 15% in the magnesium alloy.

The present inventors have analyzed a cause of the insufficient strength and fatigue characteristics of the cage made of a magnesium alloy and molded by injection molding, and have considered a countermeasure therefor. The insufficient strength and fatigue characteristics should have been obtained in the first place. As a result, the present inventors have obtained the following knowledge and arrived at the present invention.

Specifically, when fabricating a cage made of a magnesium alloy by means of injection molding, flows of the magnesium alloy including a liquid phase are moved to fill the inside (cavity portion) of the mold. On this occasion, a region at which the flows of magnesium alloy including a liquid phase are merged is formed depending on the shape of the cage and the number of gates. Here, the magnesium alloy for the injection molding is supplied into the mold with its viscosity significantly smaller than that of a general resin. Further, the magnesium alloy has a smaller specific heat than such a general resin, is therefore excellent in thermal conductivity, and is accordingly solidified fast. To address such characteristics of the magnesium alloy, the magnesium alloy is supplied into the mold at a rate faster by several times or approximately ten times than injection molding of the general resin. This is likely to cause turbulent flows of the magnesium alloy. Accordingly, gas (such as air) in the mold is likely to be involved therein. As a result, the gas is contained in the region at which the flows of magnesium alloy are merged, thereby forming a confluence region including a void. The void in the confluence region results in insufficient strength of such a cage made of magnesium alloy although the strength and fatigue characteristics thereof should have been sufficient in the first place.

To address this, in the cage of the present invention, the confluence region including the void formed by the merging of the flows of magnesium alloy including a liquid phase is brought away to outside the cage. As a result, according to the cage of the present invention, there can be provided a cage made of a magnesium alloy and having a light weight and a high strength.

Further, in the cage of the present invention, when viewing the cross sectional surface of the cage, the ratio of the α phase having a grain size of 20 μm or greater is less than 15% in the magnesium alloy. The α phase (solid phase formed of pure magnesium) having a grain size of 20 μm or greater in the magnesium alloy is a factor to decrease the strength of the cage. Accordingly, by reducing the ratio of the α phase having a grain size of 20 μm or greater in the magnesium alloy constituting the cage, strength is improved in the weld portion and portions other than the weld portion. More specifically, when observing the cross sectional surface of the cage, the strength of the cage can be effectively improved by setting the ratio of the α phase having a grain size of 20 μm or greater in the magnesium alloy to be less than 15%.

Further, the cage is preferably manufactured by injecting, into the mold, a magnesium alloy controlled to only have a liquid phase (controlled not to include an α phase; completely molten state) by heating to fall within a temperature range equal to or higher than the melting point thereof. Accordingly, a cage made of a magnesium alloy can be provided which suppresses formation of coarse α phase (α phase crystal grain) and is excellent in fatigue strength. It should be noted that the coarse α phase herein refers to an α phase having a crystal grain size of 20 μm or greater, such as a crystal grain size of more than 100 μm. Such a coarse α phase is formed as follows. That is, an α phase generated in an injection molding cylinder and having a generally spherical shape becomes coarse in the procedure of molding from injection to cooling and solidification.

Further, in the cage, when observing the cross sectional surface of the cage, the ratio of the α phase having a grain size of 20 μm or greater is more preferably less than 5% in the magnesium alloy. Further preferably, in the cage, when observing the cross sectional surface of the cage, no α phase having a grain size of 20 μm or greater is contained in the magnesium alloy.

By setting the ratio of the α phase having a grain size of 20 μm or greater to be less than 5%, the strength of the cage can be further improved. Further, by setting the ratio of the α phase having a grain size of 20 μm or greater to be less than 2%, the strength of the cage can be further improved. Further, by configuring not to contain the α phase having a grain size of 20 μm or greater, the strength of the cage is further improved. Here, the state in which the α phase having a grain size of 20 μm or greater is not contained refers to a state in which the α phase having a grain size of 20 μm or greater is not substantially contained in the magnesium alloy. Specifically, when randomly observing the cross sectional surface of the cage at its four or more regions of 10 mm² or greater and confirming no α phase having a grain size of 20 μm or greater, it can be determined that the α phase having a grain size of 20 μm or greater is not substantially contained in the magnesium alloy constituting the cage.

In the cage, the magnesium alloy preferably contains aluminum, zinc, and manganese. The magnesium alloy containing aluminum, zinc, and manganese is suitable for injection molding. Using such a magnesium alloy, the cage of the present invention can be manufactured readily. Here, an example of such a magnesium alloy containing aluminum, zinc, and manganese is the ASTM standard AZ91D.

The cage may be comb-shaped. Such a comb-shaped cage has a comb-like shape having an annular portion having an annular shape, and a plurality of pillar portions axially projecting from the annular portion. Hence, the pillar portions are likely to be deflected and therefore the cage is required to have a high specific rigidity. Hence, the cage of the present invention, which is made of a magnesium alloy and therefore has a high specific rigidity, is suitably employed for the comb-shaped cage.

Preferably in the cage, a ratio of tensile strength in a weld portion of the cage to tensile strength in a portion other than the weld portion is 0.8 or greater, the weld portion being formed at a region at which the flows of the magnesium alloy are merged during the injection molding.

The cage formed of magnesium alloy and manufactured through the injection molding basically has a high strength, but the strength in the weld portion is lower than that in the other regions. Such insufficiency of the strength in the weld portion may lead to breakage. To address this, by setting the above-described ratio to be 0.8 or greater, the breakage of the cage due to the insufficient strength of the weld portion can be suppressed.

The cage may have a surface provided with an anodized layer (alteration layer) having a thickness of 15 μm or smaller. The formation of the anodized layer can lead to improved corrosion resistance and wear resistance. On the other hand, when the thickness of the anodized layer becomes larger, growth of a recess portion (increase of surface roughness) or change in shape such as volume expansion, both of which are involved in the alteration of characteristics, become greater. When the thickness thereof exceeds 15 μm, the change in shape may adversely affect the characteristics of the cage. Hence, the anodized layer (alteration layer) preferably has a thickness of 15 μm or smaller. Further, particularly, in order to secure the required smoothness of the surface of the cage, the thickness thereof is preferably 10 μm or smaller.

Further, the cage may have a surface provided with a nickel plating film. The formation of the nickel plating film can particularly lead to improved wear resistance. The film thickness of the nickel plating film may be determined as required, in view of the wear resistance and the corrosion resistance. As the film thickness is made thicker, the corrosion resistance is improved. Meanwhile, when the thickness of the nickel plating film exceeds 15 μm, the plating film thickness is likely to be varied among portions thereof. This may lead to generation of worn powders due to partial contact with the rolling element or the guide surface of the inner ring, the outer ring, or the like. Accordingly, this may result in deteriorated rotational accuracy and generation of vibrations, in some cases, acceleration of deterioration of lubricant due to the generated worn powder and vibrations. Hence, it is preferable that the nickel plating film has a thickness of 15 μm or smaller. On the other hand, when the nickel plating film has a thickness of less than 5 μm, the corrosion resistance possibly becomes insufficient and the wear resistance also possibly becomes insufficient. Hence, it is preferable that the nickel plating film has a thickness of 5 μm or greater.

Further, the cage may have a surface provided with a cation electrodeposition coating layer having a thickness of 15 μm or smaller. The formation of the cation electrodeposition coating layer can lead to improved corrosion resistance and lubricity. Meanwhile, even when the cation electrodeposition coating layer has a thickness of more than 15 μm, the corrosion resistance and the lubricity are not improved greatly. Hence, it is preferable that the cation electrodeposition coating layer has a thickness of 15 μm or smaller.

In the cage, the magnesium alloy constituting the cage preferably has an average crystal grain size of 10 μm or smaller, more preferably, 5 μm or smaller. Thus, by reducing the average crystal grain size in the matrix of the magnesium alloy, the strength of the cage can be improved.

In the cage, the magnesium alloy constituting the cage may be subjected to an age hardening treatment. This leads to improved strength in each of the cages.

A rolling bearing according to the first aspect of the present invention includes: a raceway member; a plurality of rolling elements arranged in contact with the raceway member; and a cage rollably holding the rolling elements. The cage is the above-described cage according to the present invention.

According to the rolling bearing in the first aspect of the present invention, there can be provided a rolling bearing including a cage formed of a magnesium alloy, light in weight, and having a high strength.

The rolling bearing may be a bearing used to rotatably support a main shaft of a machine tool relative to a member disposed opposite to the main shaft.

The main shaft of the machine tool is rotated at a very fast rotating speed. Hence, a cage of a bearing for supporting it (machine tool rolling bearing) is required to have a high strength and a light weight. Further, when rigidity is insufficient for centrifugal force resulting from the high rotating speed of the machine tool rolling bearing, the cage is deformed to result in decreased rotation precision of the bearing (NRRO (Non-Repeatable Run-Out); increased asynchronous vibration) and greater heat generation in the bearing, disadvantageously. In contrast, the rolling bearing of the present invention includes the cage made of a magnesium alloy and having not only a high strength and a light weight but also a large specific rigidity, and is therefore suitable for such a machine tool rolling bearing.

A rolling bearing in a second aspect of the present invention is a rolling bearing having a cage holding a plurality of balls between an inner ring and an outer ring, wherein: the cage is in the form of a crown having pockets that have opening portions in one side surface of an annular body thereof so as to hold the balls therein and that are arranged at a plurality of locations in the annular body in a circumferential direction; a pair of tabs are provided for each of the pockets so as to axially project from circumferential ends of the pocket in a side surface of the annular body at the opening side of the pocket to face each other in the circumferential direction and so as to constitute a portion of the pocket therebetween; and the pair of tabs provided in each of some pockets project at an axial projection amount lower than that of the pair of tabs in each of the other pockets.

According to this configuration, in the cage, the pair of tabs in each of some pockets project at an axial projection amount lower than that of the pair of tabs in the other pocket. Hence, for example, a magnesium alloy or the like can be applied which has a strength higher than a resin material or the like. Even such a crown-shaped cage to which the magnesium alloy or the like is applied can be readily extracted from a mold in injection molding, by configuring the axial projection amount of the pair of tabs to be lower as described above. Accordingly, insertion of the balls to the pockets is facilitated during assembly.

Accordingly, as compared with a cage made of a resin material, the cage achieves a high strength and a high heat resistance. As compared with a cage made of an iron plate material, the cage can achieve a high degree of freedom in shape, ease of assembly, and a light weight. Accordingly, a rolling bearing can be realized which contributes to energy saving, can be used under high-speed rotation, and achieves reduced manufacturing cost.

A rolling bearing in a third aspect of the present invention is a rolling bearing having a cage holding a plurality of balls between an inner ring and an outer ring, wherein: the cage is in the form of a crown having pockets that have opening portions in one side surface of an annular body thereof so as to hold the balls therein and that are arranged at a plurality of locations in the annular body in a circumferential direction; a pair of tabs are provided for each of the pockets so as to axially project from circumferential ends of the pocket in a side surface of the annular body at the opening side of the pocket to face each other in the circumferential direction and so as to constitute a portion of the pocket therebetween; and the pair of tabs are provided only in each of pockets located at part of the plurality of locations.

According to this configuration, particularly in the cage, only each of the pockets located at part of the plurality of locations is provided with the pair of tabs, and no tabs are provided in pockets other than the foregoing pockets. Hence, even the crown-shaped cage to which a magnesium alloy or the like is applied can be readily extracted from a mold in injection molding. Accordingly, insertion of the balls to the pockets is further facilitated during assembly as compared with the cage in the second aspect.

Accordingly, as compared with a cage made of a resin material, the cage achieves a high strength and a high heat resistance. As compared with a cage made of an iron plate material, the cage can achieve a high degree of freedom in shape, ease of assembly, and a light weight. Accordingly, a rolling bearing can be realized which contributes to energy saving, can be used under high-speed rotation, and achieves further reduction of manufacturing cost.

The cage may be an injection-molded product obtained by injection molding of a metal material lighter in weight than iron. In this case, as compared with a conventional cage made of an iron plate material, the cage can achieve a high degree of freedom in shape, ease of assembly, and a light weight.

Each of the tabs may have a narrowing shape such that its circumferential thickness becomes thinner as it extends in the axial direction toward the tip. In this case, the tip of the tab can be elastically deformed more readily than the conventional tab. This facilitates insertion of the balls to the pockets as compared with that in the conventional cage, thereby reducing the number of steps in manufacturing. In this case, the thickness of the tip of the tab is thinner than that in the conventional cage. However, a magnesium alloy or the like having a higher strength than that of a resin material or the like can be applied, whereby the cage having the tabs having their tips of thin thickness can be practically used.

Some of the pockets in the cage may be provided symmetrically relative to a plane including the axial direction of the cage. Accordingly, the cage can be prevented from being inclined or being displaced in the bearing. Accordingly, high-speed rotation of the bearing can be further achieved.

Part of the pockets at the plurality of locations in the cage may have a cylindrical shape along the radial direction. In the conventional cage, all the pockets have a spherical surface shape. In the present invention, the pockets having a cylindrical shape along the radial direction were employed, whereby part of the balls in the rolling bearing can be constrained only in the circumferential direction. In this way, a frictional resistance between the cage and each of the balls can be reduced as compared with that in the conventional art.

Some of the pockets in the cage may be each configured to include a tapered shape portion having an inner diameter getting wider as it extends toward the outer diameter side. While the bearing is operated, i.e., while centrifugal force is exerted to the cage, the ball is displaced relative to the pocket of the cage toward the outer diameter side along the tapered shape portion. In this way, the ball can be constrained in the vicinity of the opening at the inner diameter side of the cage.

The tab may be formed to be shorter than the radial dimension of the one side surface of the annular body. In this case, effects are obtained such as reduction of the material of the cage, reduction of the mass of the cage, and reduction of drag torque of grease.

The tab may be provided to have a width size corresponding to part of the radial width of the one side surface of the annular body and be shifted to the outer diameter side. In this case, during an operation of the bearing, grease is never scraped by the inner diameter side portion of the cage. Hence, grease leakage can be prevented during, in particular, rotation of the outer ring.

The tab may be provided to have a width size corresponding to part of the radial width of the one side surface of the annular body and be shifted to the inner diameter side. In this case, even if the tabs are deformed by centrifugal force during high-speed rotation, the balls can be guided.

The tab may be provided only in the pitch diameter portion so as to have a width size corresponding to part of the radial width of the one side surface of the annular body. In this case, the ball is constrained by the tab in the cage pitch diameter location. Accordingly, even when a space between each ball and each pocket is made larger than that in a cage in which the ball is constrained in a location other than the cage pitch diameter, similar constraint can be attained. This leads to an effect of decreasing drag torque of grease.

The tab may be provided only in the outer diameter side and the inner diameter side so as to have a width size corresponding to part of the radial width of the one side surface of the annular body. In this case, even when the space between the ball and the cage becomes small during the operation of the bearing, a torque reduction effect can be obtained during the operation of the bearing because the portion mainly attributed to increase of torque, i.e., the portion between the outer diameter side and the inner diameter side in the one side surface of the annular body has been removed.

The other side surface of the annular body, i.e., the side surface not provided with the pockets may have a wave shape having a recess between the pockets. In this case, the material and weight of the cage can be reduced.

The entire cage may be provided at the inner diameter side relative to the ball pitch circle. In this case, deformation of the cage toward the outer diameter side can be tolerated during high-speed rotation of the bearing. Thus, it is suitable for high-speed rotation.

In the annular body, the annular portion provided between the pockets adjacent to each other in the circumferential direction may be adapted to have a radial dimension smaller than that of each of the pockets. In this case, the cage is more likely to be twisted, thereby facilitating assembly of the cage into the rolling bearing. Accordingly, the number of manufacturing steps can be reduced.

In the one side surface of the annular body, a recess portion having a slit-like shape may be provided. In this case, the tabs of the cage are facilitated to be wider, whereby the balls can be readily inserted into the pockets.

In the cage, a solid lubricant may be incorporated. The cage may be an injection-molded product obtained by means of injection molding of a magnesium alloy. In this case, as compared with a cage made of a resin material, the cage achieves a high strength and a high heat resistance. As compared with a cage made of an iron plate material, the cage can achieve a high degree of freedom in shape, ease of assembly, and a light weight.

Each of the balls may be made of a ceramic. As the ball to be incorporated in the bearing, for example, a ball formed of a sintered compact of a ceramic such as silicon nitride, alumina, or zirconia is used. In this way, higher speed can be attained than that of a bearing having generally used steel balls incorporated therein. The ball formed of a ceramic is lighter in weight and harder than the steel ball. Hence, more stable high-speed rotation can be attained particularly when using such balls together with any one of the cages of the present invention.

The rolling bearing may be a bearing supporting a motor rotor. The rolling bearing may be used for a bearing for a joint of a robot. The rolling bearing may be used for a bearing for a hard disk drive pivot.

A crown-shaped cage in the first aspect of the present invention is a cage in the form of a crown having pockets that have opening portions in one side surface of an annular body thereof so as to hold balls therein and that are arranged at a plurality of locations in the annular body in a circumference direction, wherein: a pair of tabs are provided for each of the pockets so as to axially project from circumferential ends of the pocket in a side surface of the annular body at the opening side of the pocket to face each other in the circumferential direction and so as to constitute a portion of the pocket therebetween; and the pair of tabs provided in each of some pockets project at an axial projection amount lower than that of the pair of tabs in each of the other pockets.

According to this configuration, the pair of tabs in each of some pockets projects at an axial projection amount lower than that of the pair of tabs in the other pocket. Hence, for example, a magnesium alloy or the like can be applied which has a strength higher than that of a resin material or the like. Even such a crown-shaped cage to which the magnesium alloy or the like is applied can be readily extracted from a mold in injection molding, by configuring the axial projection amount of the pair of tabs to be lower as described above. Accordingly, insertion of the balls to the pockets is facilitated during assembly.

A crown-shaped cage in a second aspect of the present invention is a cage is in the form of a crown having pockets that have opening portions in one side surface of an annular body thereof so as to hold balls therein and that are arranged at a plurality of locations in the annular body in a circumference direction, wherein a pair of tabs are provided only in each of part of the pockets at the plurality of locations so as to axially project from circumferential ends of the pocket in a side surface of the annular body at the opening side of the pocket to face each other in the circumferential direction and so as to constitute a portion of the pocket therebetween.

According to this configuration, particularly, only each of part of the pockets at the plurality of locations is provided with the pair of tabs, and each of the pockets other than the foregoing pockets is not provided with tabs. Hence, even such a crown-shaped cage to which a magnesium alloy or the like is applied can be readily extracted from a mold in injection molding. Further, insertion of the balls to the pockets is facilitated as compared with the crown-shaped cage in the first aspect.

Advantageous Effects of Invention

As apparent from the description above, according to the cage of the present invention, there can be provided a cage made of a magnesium alloy and having a light weight and a high strength. Further, according to the rolling bearing in the first aspect of the present invention, there can be provided a rolling bearing including a cage made of a magnesium alloy and having a light weight and a high strength.

The rolling bearing in the second aspect of the present invention is the rolling bearing having the cage holding the plurality of balls between the inner ring and the outer ring, wherein: the cage is in the form of the crown having the pockets that have the opening portions in the one side surface of the annular body thereof so as to hold the balls therein and that are arranged at the plurality of locations in the annular body in the circumference direction; the pair of tabs are provided for each of the pockets so as to axially project from the circumferential ends of the pocket in the side surface of the annular body at the opening side of the pocket to face each other in the circumferential direction and so as to constitute the portion of the pocket therebetween; and the pair of tabs provided in each of some pockets project at an axial projection amount lower than that of the pair of tabs in each of the other pockets. Accordingly, a strength becomes higher than that of the resin material, injection molding is allowed, and insertion of rolling elements is facilitated during assembly of the bearing.

The rolling bearing in the third aspect of the present invention is the rolling bearing having the cage holding the plurality of balls between the inner ring and the outer ring, wherein: the cage is in the form of a crown having the pockets that have opening portions in the one side surface of the annular body thereof so as to hold the balls therein and that are arranged at the plurality of locations in the annular body in the circumference direction; and the pair of tabs are provided only in each of part of the pockets at the plurality of locations so as to axially project from circumferential ends of the pocket in the side surface of the annular body at the opening side of the pocket to face each other in the circumferential direction and so as to constitute the portion of the pocket therebetween. Accordingly, a strength becomes higher than that of the resin material, injection molding is allowed, and insertion of rolling elements is facilitated during assembly of the bearing.

DESCRIPTION OF EMBODIMENTS

Figure 1:
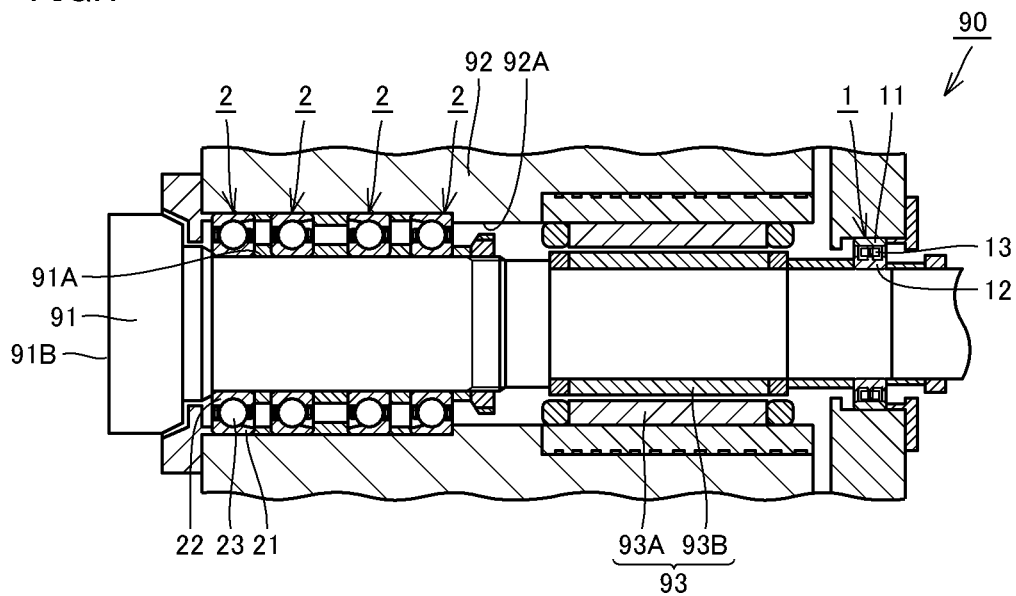
FIG. 1 is a schematic cross sectional view showing a configuration around a main shaft of a machine tool including machine tool rolling bearings.

The following describes embodiments of the present invention with reference to figures. It should be noted that in the below-mentioned figures, the same or corresponding portions are given the same reference characters and are not described repeatedly.

First Embodiment

First, one embodiment of the present invention, i.e., a first embodiment will be described. Referring to FIG. 1, a machine tool 90 in the present embodiment includes: a main shaft 91 having a cylindrical shape; a housing 92 surrounding the outer circumferential surface of main shaft 91; and a double-row cylindrical roller bearing 1 (rear bearing) and angular contact ball bearings 2 (front bearing) serving as machine tool rolling bearings. Double-row cylindrical roller bearing 1 and each of angular contact ball bearings 2 are disposed to be fit between main shaft 91 and housing 92 such that the respective outer circumferential surfaces of their outer ring 11 and outer ring 21 are in contact with an inner wall 92A of the housing and the respective inner circumferential surfaces of their inner ring 12 and inner ring 22 are in contact with outer circumferential surface 91A of main shaft 91. Accordingly, main shaft 91 is supported to be axially rotatable relative to housing 92.

Further, at main shaft 91, a motor rotor 93B is installed to partially surround outer circumferential surface 91A. On inner wall 92A of housing 92, a motor stator 93A is installed at a location opposite to motor rotor 93B. Motor stator 93A and motor rotor 93B constitute a motor 93 (built-in motor). Accordingly, main shaft 91 is rotatable relative to housing 92 by motive power provided by motor 93.

In other words, each of double-row cylindrical roller bearing 1 and angular contact ball bearing 2 is a machine tool rolling bearing for rotatably supporting main shaft 91 of machine tool 90 relative to housing 92, which is a member disposed opposite to main shaft 91.

The following describes an operation of machine tool 90. Referring to FIG. 1, when motor stator 93A of motor 93 is fed with electric power from a power source not shown in the figure, driving power for axially rotating motor rotor 93B is generated. Accordingly, main shaft 91, which is rotatably supported relative to housing 92 by angular contact ball bearings 2 and double-row cylindrical roller bearing 1, is rotated together with motor rotor 93B relative to housing 92. With main shaft 91 thus rotating, a tool (not shown in the figure) attached to tip 91B of main shaft 91 cuts or grinds a workpiece. In this way, the workpiece can be processed.

Figure 2:
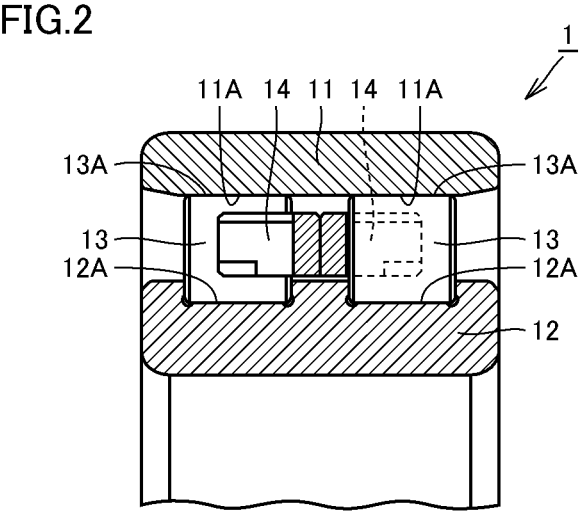
FIG. 2 is a schematic partial cross sectional view illustrating a configuration of a double-row cylindrical roller bearing.

The following describes double-row cylindrical roller bearing 1. Referring to FIG. 2, double-row cylindrical roller bearing 1 includes: outer ring 11 serving as a first raceway member; inner ring 12 serving as a second raceway member; cylindrical rollers 13 serving as a plurality of rolling elements; and cages 14. Outer ring 11 has an inner circumferential surface provided with outer ring raceway surfaces 11A each serving as a first raceway surface of an annular shape and formed in double rows (two rows). Inner ring 12 has an outer circumferential surface provided with inner ring raceway surfaces 12A each serving as a second raceway surface of an annular shape and formed in double rows (two rows) opposite to outer ring raceway surfaces 11A formed in double rows (two rows). Further, each of the plurality of cylindrical rollers 13 is provided with a roller contact surface 13A (outer circumferential surface of cylindrical roller 13) serving as a rolling element contact surface. Further, cylindrical rollers 13 are in contact with outer ring raceway surfaces 11A and inner ring raceway surfaces 12A at roller contact surfaces 13A and are arranged circumferentially at a predetermined pitch using cages 14 each having an annular shape. Accordingly, cylindrical rollers 13 can be held to be rollable on the annular raceways of the two rows. In this way, outer ring 11 and inner ring 12 are rotatable relative to each other.

Figure 3:
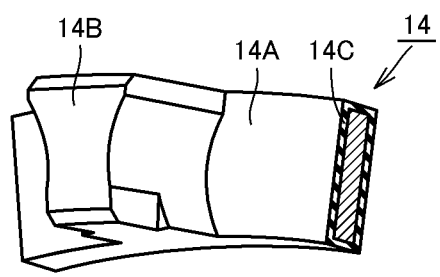
FIG. 3 is a schematic diagram showing a configuration of a cage of the double-row cylindrical roller bearing.

Here, referring to FIG. 3, each of cages 14 is a comb-shaped cage including an annular portion 14A having an annular shape and a plurality of pillar portions 14B axially projecting from annular portion 14A. Further, as shown in FIG. 2, two cages 14 are incorporated in double-row cylindrical roller bearing 1 such that respective surfaces of annular portions 14A opposite to surfaces from which pillar portions 14B project face each other and are concentric with each other.

Further, each of cages 14 is made of a magnesium alloy such as AZ91D, and is molded by means of injection molding. In this cage 14, a confluence region, which is a region including voids formed by merging of flows of the magnesium alloy during the injection molding, has been eliminated by pushing the confluence region out of cage 14. Accordingly, cage 14 becomes a cage made of magnesium alloy and having a light weight and a high strength. Further, because cage 14 is thus made of magnesium alloy, sufficient specific rigidity is secured in cage 14, which is a comb-shaped cage having pillar portions 14B likely to be deflected and therefore required to have a high specific rigidity.

Further, double-row cylindrical roller bearing 1 having such cages 14 is a highly reliable rolling bearing suitable for a machine tool rolling bearing required to attain high-speed rotation.

Here, the following describes advantages of employing each of cages 14 formed through injection molding and made of magnesium alloy in the present embodiment. Because cage 14 thus made of magnesium alloy has a specific gravity smaller than a cage having the same shape and made of brass, energy loss caused by the cage under intermittent operations can be reduced to, for example, 30% or smaller. Further, cage 14 thus molded through injection molding is better in mass production than a cage made of a general metal and manufactured by machining such as cutting.

Further, because each of the cages employed in double-row cylindrical roller bearing 1 is thus made of magnesium alloy excellent in specific rigidity, the cage is less likely to be deformed even when double-row cylindrical roller bearing 1 is employed as a bearing used under high-speed rotation involving generation of large centrifugal force, such as a machine tool rolling bearing. It should be noted that the specific rigidity of the magnesium alloy (value obtained by dividing an elastic modulus by the specific gravity) is 2.5 times as large as high strength brass or greater than that, and is 1.5 times as large as a fiber-reinforced resin such as carbon fiber-reinforced PEEK resin or greater than that. Further, in general, such a fiber-reinforced resin is excellent in specific strength (value obtained by dividing the strength by the specific gravity). However, the specific strength of the magnesium alloy is equal to or greater than that of the fiber-reinforced resin and is 2.5 times as large as that of the high strength brass or greater than that.

Further, unlike the fiber-added resin and the like, the magnesium alloy does not have molding anisotropy or has very small molding anisotropy. Accordingly, a sink mark or deformation resulting from such molding anisotropy is suppressed. In addition, the magnesium alloy has a smaller linear expansion coefficient than that of the resin material. Hence, a cage with high precision can be manufactured through injection molding.

Such high specific rigidity and injection precision lead to excellent rotation precision (low NRRO). Further, the magnesium alloy is excellent in absorbing vibrations, and is therefore expected to reduce operation sound of the bearing (noise reduction).

Further, the magnesium alloy has a heat conductivity higher than that of a resin, and is therefore excellent in heat dissipation. As a result, temperature can be suppressed from rising during the operation of the bearing, thereby reducing deterioration of lubricant caused by heat. This leads to longer life of the rolling bearing.

Further, if a raw material employed for the cage made of fiber-reinforced resin is a pulverized material, which is obtained by pulverizing a molded product, or a recycle material such as a re-pelleted material, which is granulated again by a fusion kneading machine, problems may take place such as physical property deterioration resulting from breakage of a reinforcement material such as a fiber or decreased matrix strength resulting from thermal deterioration. In contrast, recycling of the cage made of magnesium alloy does not result in decreased strength and also requires only approximately 5% of energy as compared with a case of producing (smelting) a new cage. In general injection molding, irrespective of employing a resin material or a magnesium alloy as the raw material, a waste matter such as a solidified portion is produced in a sprue portion or a runner portion in a mold. Here, because the magnesium alloy is excellent in terms of recycle as described above, substantially no waste matter is produced when the magnesium alloy is employed as the raw material of the cage, thereby reducing environmental burden. In addition, material cost can be reduced while securing reliability for strength. Hence, as the raw material of cage 14 in the present embodiment, it is preferable to employ magnesium alloy chips produced from a recycle material thereof.

Here, referring to FIG. 3, cage 14 in the present embodiment has a surface on which a surface treatment layer 14C having a thickness of 15 μm or smaller is formed. This surface treatment layer 14C is not an essential configuration in the cage of the present invention. However, by forming this, corrosion resistance, wear resistance, and the like can be improved. Surface treatment layer 14C may be an anodized layer (alteration layer) formed by means of anodizing, or may be a nickel plating film formed by means of nickel plating or a resin layer formed by means of cation electrodeposition coating or the like, for example.

Figure 4:
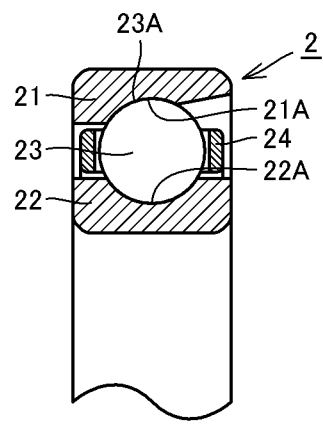
FIG. 4 is a schematic partial cross sectional view showing a configuration of an angular contact ball bearing.

The following describes each of angular contact ball bearings 2 described above. Referring to FIG. 4 and FIG. 2, angular contact ball bearing 2 and double-row cylindrical roller bearing 1 have basically the same configuration and provides basically the same effect. However, angular contact ball bearing 2 is different from double-row cylindrical roller bearing 1 in terms of shapes and the like of the bearing rings and the rolling elements.

Namely, angular contact ball bearing 2 includes outer ring 21 serving as a first raceway member; inner ring 22 serving as a second raceway member; balls 23 serving as a plurality of rolling elements; and a cage 24. Outer ring 21 has an inner circumferential surface provided with an outer ring raceway surface 21A serving as a first raceway surface of an annular shape. Inner ring 22 has an outer circumferential surface provided with an inner ring raceway surface 22A serving as a second raceway surface of an annular shape opposite to outer ring raceway surface 21A. Further, each of the plurality of balls 23 is provided with a ball contact surface 23A (surface of ball 23) serving as a rolling element contact surface. Further, balls 23 are in contact with outer ring raceway surface 21A and inner ring raceway surface 22A at ball contact surfaces 23A and are arranged circumferentially at a predetermined pitch using cage 24 having an annular shape. Accordingly, balls 23 can be held to be rollable on the annular raceways. In this way, outer ring 21 and inner ring 22 are rotatable relative to each other.

Here, in angular contact ball bearing 2, a straight line connecting a contact point of each ball 23 and outer ring 21 to a contact point of ball 23 and inner ring 22 is angled relative to the radial direction (direction perpendicular to the rotation axis of angular contact ball bearing 2). Hence, angular contact ball bearing 2 is capable of receiving not only a load in the radial direction but also a load in the axial direction. Moreover, when the load in the radial direction is imposed, a component of force is generated in the axial direction (direction of the rotation axis of angular contact ball bearing 2). Referring to FIG. 1, in machine tool 90 of the present embodiment, two angular contact ball bearings 2 oriented in the one direction are provided at the front side (side closer to tip 91B of main shaft 91), and two angular contact ball bearings 2 oriented in a direction opposite to the direction of angular contact ball bearings 2 located at the front side are provided at the rear side (side closer to motor rotor 93B). In this way, the component of force is canceled.

Further, cage 24 is made of a magnesium alloy such as AZ91D, and is molded by means of injection molding. Further, in cage 24, a confluence region, which is a region including voids formed by merging of flows of the magnesium alloy during the injection molding, has been eliminated by pushing the confluence region out of cage 24. Accordingly, cage 24 becomes a cage made of magnesium alloy and having a light weight and a high strength.

Here, when viewing a cross sectional surface of each of cages 14, 24, a ratio of an α phase having a grain size of 20 μm or greater in the magnesium alloy constituting each of cages 14, 24 is less than 15%. More preferably, the ratio of the α phase is less than 5%. Further, when viewing the cross sectional surface of each of cages 14, 24, no α phase having a grain size of 20 μm or greater is preferably contained in the magnesium alloy of each of cages 14, 24. This leads to further improved strength in each of the cages.

Further, a ratio of tensile strength in the cage's weld portion formed at a region in which flows of the magnesium alloy are merged during the injection molding, to tensile strength in a portion other than the weld portion is desirably 0.8 or greater. Accordingly, cages 14, 24 can be suppressed from being damaged due to insufficient strength in the weld portion. The weld portion can be suppressed from having insufficient strength, by manufacturing each of cages 14, 24 using the below-described manufacturing method, for example.

Figure 5:
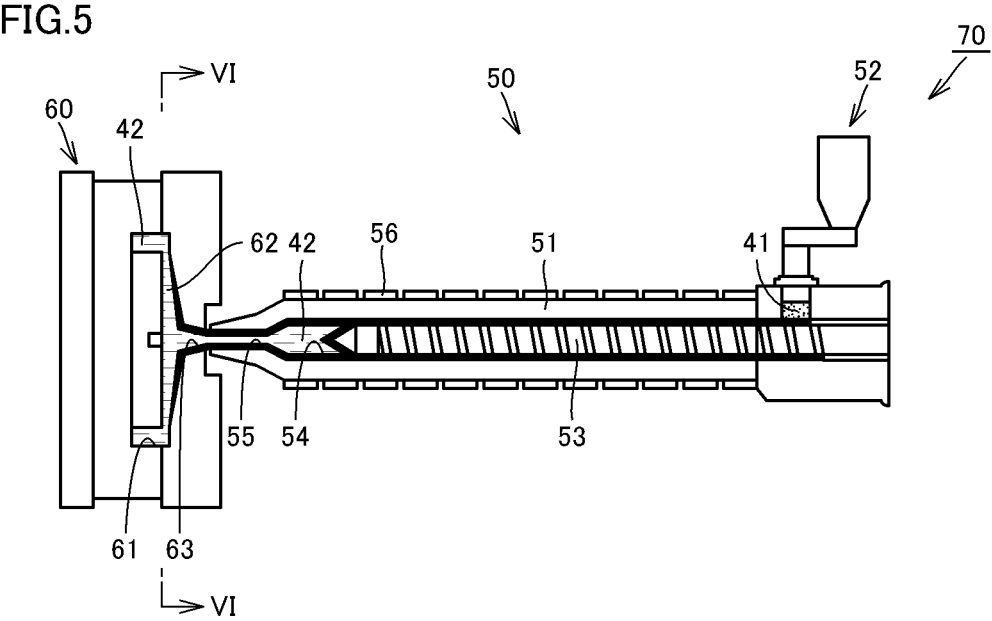
FIG. 5 is a schematic diagram showing a configuration of an injection molding device.

The following describes a method for manufacturing the cage in the present embodiment. First, an injection molding device used in the present embodiment will be described. Referring to FIG. 5, an injection molding device 70 in the present embodiment includes an injection portion 50 and a mold 60. Injection portion 50 includes: a cylinder 51 having a cylindrical hollow portion; a supplying portion 52 connected to the hollow portion of cylinder 51 and supplying magnesium alloy chips 41 to the hollow portion; a screw 53 fit into the hollow portion of cylinder 51 and having a helical groove at its outer circumferential surface; and a heater 56 disposed to surround cylinder 51. Cylinder 51 has a nozzle 55 formed at one end thereof and connected to mold 60. Further, a reservoir 54 is formed adjacent to one end of screw 53. Reservoir 54 is a region surrounded by the tip of screw 53 (end closer to mold 60) and cylinder 51. Further, reservoir 54 is connected to mold 60 via nozzle 55.

Figure 6:
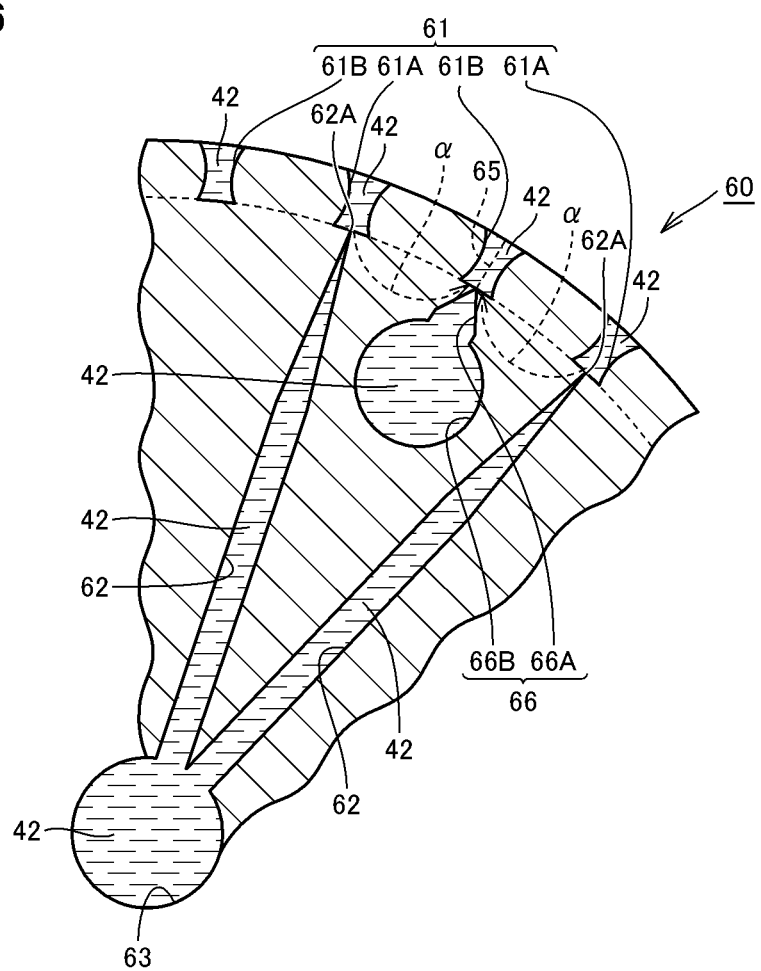
FIG. 6 is a schematic diagram showing a configuration of a mold in the first embodiment.

Referring to FIG. 5 and FIG. 6, mold 60 includes: a sprue portion 63, which is a hollow region connected to the hollow region of nozzle 55 of cylinder 51; cavity portions 61, which are hollow regions corresponding to the shape of the cage; and runner portions 62 radially extending from sprue portion 63 and connected to cavity portions 61. Each of runner portions 62 includes a gate portion 62A, and is connected to a cavity portion 61 at gate portion 62A. Cavity portions 61 include a weld region 65, which is a region at which flows of magnesium alloy supplied from runner portions 62 to cavity portions 61 are merged. Mold 60 further includes an overflow portion 66 connected to weld region 65 and storing magnesium alloy having reached weld region 65 and flooded from cavity portion 61. Overflow portion 66 has a discharging portion 66A connected to weld region 65, and a retaining portion 66B connected to discharging portion 66A.

Figure 7:
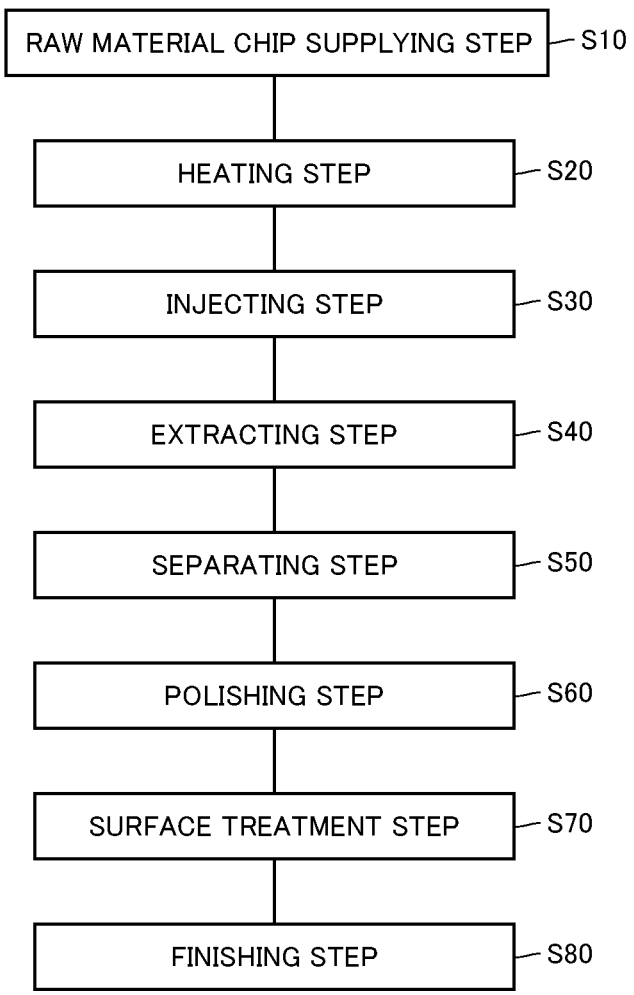
FIG. 7 is a flowchart schematically showing steps in manufacturing the cage.

Referring to FIG. 5-FIG. 7, the following describes a method for manufacturing the cage using injection molding device 70 described above. Referring to FIG. 7, in the method for manufacturing the cage in the present embodiment, a raw material chip supplying step is first performed as a step (S10). In this step (S10), referring to FIG. 5, magnesium alloy chips 41 produced from a recycle material are supplied from supplying portion 52 of injection portion 50 into cylinder 51.

Next, as a step (S20), a heating step is performed. In this step (S20), screw 53 is rotated axially to move magnesium alloy chips 41, which has been supplied into cylinder 51 in step (S10), along the helical groove formed at the outer circumferential surface of screw 53, while heating magnesium alloy chips 41 to reach or exceed the melting point thereof using heater 56. Accordingly, magnesium alloy chips 41 are brought into a molten state, i.e., become molten magnesium alloy 42, which is then stored in reservoir 54. On this occasion, molten magnesium alloy 42 may be in a complete molten state, i.e., have only a liquid phase with no solid phase, or may be in a semi-molten state in which magnesium in the solid phase (α phase) is dispersed in the liquid phase. However, in the case of the semi-molten state, the ratio of solid phase is preferably small. Specifically, the ratio of the α phase is adjusted to be less than 15% in area ratio when observing a cross section of the magnesium alloy after solidification thereof. The area ratio of the α phase is preferably less than 5%. This suppresses fatigue strength, etc., of the completed cage from decreasing due to a coarse α phase having a grain size of 20 μm or greater and serving as a source of stress concentration. Meanwhile, when the ratio of the α phase having a grain size of 20 μm or greater is set to be less than 2% in the area ratio, decrease of fatigue strength and the like of the cage can be further suppressed.

Next, an injecting step is performed as a step (S30). In this step (S30), screw 53 is moved to come closer to mold 60, thereby injecting molten magnesium alloy 42, which has been stored in reservoir 54 in step (S20), into mold 60. Referring to FIG. 6, molten magnesium alloy 42 thus injected into mold 60 is first supplied to sprue portion 63, and then is branched into the plurality of runner portions 62 to flow into cavity portions 61. On this occasion, in the case where the cage is to be shaped to have an even number of pockets for holding rolling elements as shown in FIG. 6, molten magnesium alloy 42 is injected from adjacent runner portions 62 into cavity portions 61A disposed to sandwich two pockets therebetween, i.e., disposed to come alternately in cavity portions 61, for example. Here, cavity portions 61 adjacent to each other (cavity portion 61A and cavity portion 61B) in FIG. 6 are coupled to each other at front and rear sides in the axial direction (the forward and backward sides in the plane of sheet). Hence, the flows of molten magnesium alloy 42 supplied into the two cavity portions 61A from runner portions 62 are merged as indicated by broken line arrows α at weld region 65 of cavity portion 61B sandwiched between the two cavity portions 61A. When molten magnesium alloy 42 is further provided to the two cavity portions 61A, molten magnesium alloy 42 is flooded from the cavity portions to flow into overflow portion 66 and is then stored therein.

Next, as a step (S40), an extracting step is performed. In this step (S40), the cage, which has been fabricated by the injection and solidification in mold 60 in step (S30), is extracted from mold 60.

Figure 8:
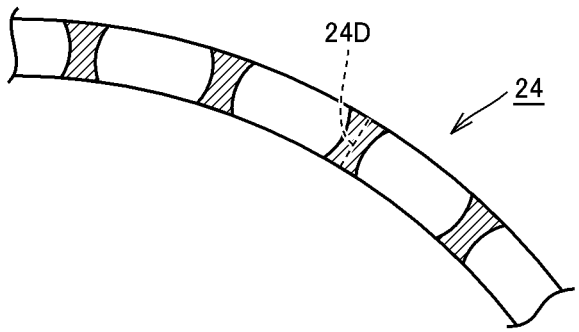
FIG. 8 is a schematic partial cross sectional view showing the structure of the cage.

Further, as a step (S50), a separating step is performed. The cage thus extracted in step (S40) has a magnesium alloy solidified in runner portions 62 or overflow portion 66. In this step (S50), such a magnesium alloy constituting a region other than the cage itself is separated from the cage. In this way, for example, referring to FIG. 8, cage 24 is obtained.

Here, in the present embodiment, referring to FIG. 6, each runner portion 62 has a gate portion boundary surface, which is a surface of a boundary with cavity portion 61. The gate portion boundary surface has a cross sectional area smaller than the area of a cross section parallel to the gate portion boundary surface in a region adjacent to the gate portion boundary surface. More specifically, runner portion 62 has a smaller cross sectional area in a cross section perpendicular to the longitudinal direction thereof, as it come closer to cavity portion 61. At the gate portion boundary surface, runner portion 62 has the smallest cross sectional area. Further, overflow portion 66 has a discharging portion boundary surface, which is a surface of boundary with cavity portion 61. The discharging portion boundary surface has a cross sectional area smaller than the area of a cross section parallel to the discharging portion boundary surface in a region adjacent to the discharging portion boundary surface. Namely, as with runner portion 62, overflow portion 66 has a smaller cross sectional area in a cross section perpendicular to the longitudinal direction thereof, as it come closer to cavity portion 61. At the discharging portion boundary surface, overflow portion 66 has the smallest cross sectional area. Accordingly, the magnesium alloy (cage) solidified in cavity portion 61 and the magnesium alloy solidified in each of runner portions 62 can be readily separated from each other at the gate portion boundary surface. Likewise, the magnesium alloy (cage) solidified in cavity portion 61 and the magnesium alloy solidified in overflow portion 66 can be readily separated from each other at the discharging portion boundary surface. As a result, in the present embodiment, step (S40) and step (S50) can be performed simultaneously. In other words, when extracting the cage from mold 60, the magnesium alloy in the regions other than the cage can be separated from the cage.

Next, as a step (S60), a polishing step is performed. In this step (S60), the cage thus separated in step (S50) is subjected to polishing such as barrel polishing. Accordingly, the surface of the cage becomes smooth.

Next, as a step (S70), a surface treatment step is performed. In this step (S70), the surface of the cage is treated, for example, anodized. Step (S70) is not an essential step in the method for manufacturing the cage of the present invention, but improves corrosion resistance and wear resistance of the cage when performed.

Then, as a step (S80), a finishing step is performed. In this step (S80), a polishing treatment, such as barrel polishing, performed when the surface treatment in step (S70) results in large irregularities at the surface thereof, a sealing treatment, an overcoat treatment, or the like is performed as required. With the steps described above, cage 14 or cage 24 in the present embodiment is completed.

In the method for manufacturing the cage in the present embodiment, the flows of molten magnesium alloy 42 are merged in step (S30) as described above, thereby forming the confluence region, which includes voids, in weld region 65 of cavity portion 61B. However, this confluence region is pushed out of the cage (cavity portion 61) because molten magnesium alloy 42 is flooded from cavity portion 61B to flow into overflow portion 66. As a result, the confluence region is eliminated from the cage. Accordingly, the confluence region including the voids is prevented from remaining in the cage to result in decreased strength. Thus, according to the method for manufacturing the cage using injection molding device 70 in the present embodiment, referring to FIG. 8 for example, there can be manufactured cage 24 made of magnesium alloy and having a light weight and a high strength. It should be noted that whether or not the confluence region has been pushed out of cavity portion 61 can be confirmed by examining the surface and cross section of weld portion 24D of completed cage 24, for example. Specifically, weld portion 24D formed between adjacent gates or around the rolling element holding portion of cage 24 has a characteristic external appearance, generally called "weld line". In cage 24 manufactured using the manufacturing method in the present invention, no weld line exists or a trace of fluidity extending from the inside of cage 24 toward outside or a trace of removal of the overflow portion is observed. Depending on conditions of molding, whether or not the confluence region has been pushed out of cavity portion 61 can be confirmed in some cases by texture observation because the abundance of the coarse α phase having a grain size of 20 μm or greater in the vicinity of the discharging portion is likely to be smaller than that in the vicinity of the gate portion due to a difference of cooling rates in the mold.

Further, according to the method for manufacturing cage 24 in the present embodiment, the confluence region is excluded from cage 24 to suppress decrease of strength in weld portion 24D as described above. Accordingly, the ratio of the tensile strength in weld portion 24D of cage 24 to the tensile strength in the portion other than weld portion 24D can be 0.8 or greater.

Second Embodiment

The following describes another embodiment of the present invention, i.e., a second embodiment. Cages and rolling bearings in the second embodiment have configurations similar to those in the first embodiment, provide similar effects, and can be manufactured in similar manners. They are different in that while each of the cages in the first embodiment has the even number of pockets for holding the rolling elements, each of the cages in the second embodiment has an odd number of pockets. Accordingly, the first embodiment and the second embodiment differ from each other in the configurations of the molds used in injection molding.

Figure 9:
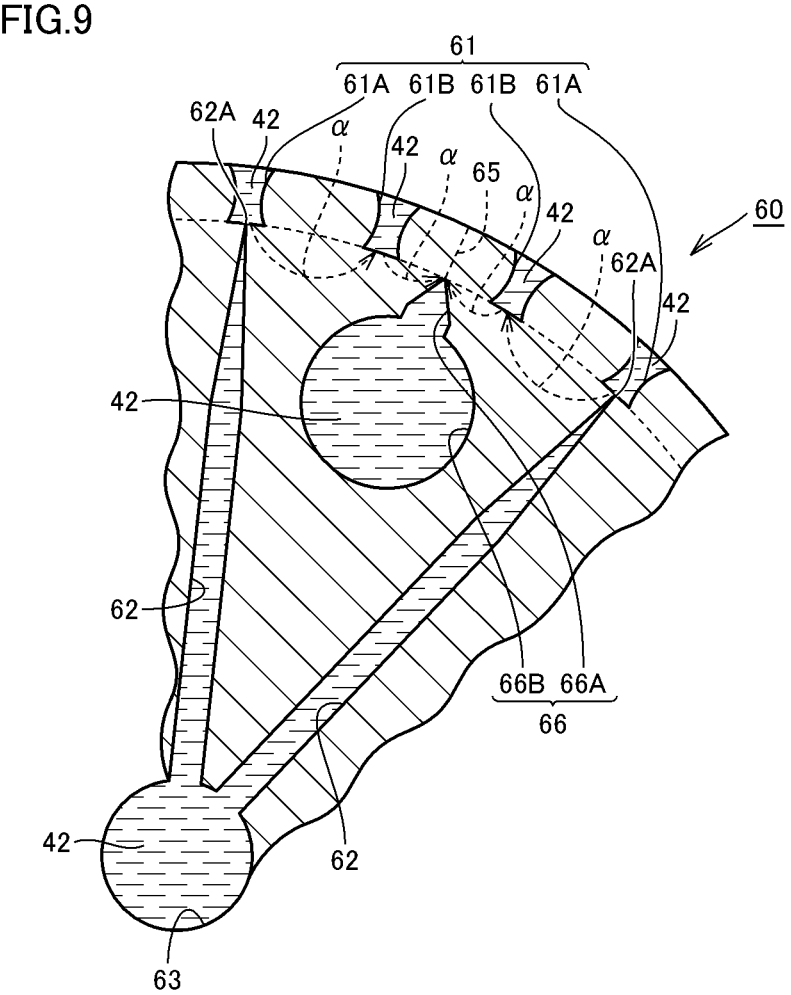
FIG. 9 is a schematic diagram showing a configuration of a mold in a second embodiment.

Referring to FIG. 9, in the case where the cage is to be shaped to have the odd number of pockets for holding the rolling elements in the second embodiment, molten magnesium alloy 42 is injected from adjacent runner portions 62 into cavity portions 61A disposed to sandwich, for example, three pockets therebetween, i.e., disposed to come every three cavity portions 61. Here, cavity portions 61 adjacent to each other in FIG. 9 are coupled to each other at front and rear sides in the axial direction (the forward and backward sides in the plane of sheet). Hence, the flows of molten magnesium alloy 42 supplied into two cavity portions 61A from runner portions 62 come into two cavity portions 61B sandwiched between the two cavity portions 61A and are merged at weld region 65 formed in the center between the two cavity portions 61B (front or rear side in the plane of sheet), as indicated by broken line arrows α. When molten magnesium alloy 42 is further provided to the two cavity portions 61A, molten magnesium alloy 42 is flooded from the cavity portions to flow into overflow portion 66 and is then stored therein.

Also in the present embodiment, as with the first embodiment, the flows of molten magnesium alloy 42 are merged in step (S30) to form a confluence region including voids in weld region 65. In the second embodiment, this weld region 65 is located at the central portion of the pockets, which is a region thin in thickness (central portion in the circumferential direction of the cage). Accordingly, if the confluence region having the voids remains in the region, the strength of the cage is likely to be less sufficient than that in the first embodiment. However, this confluence region is pushed out of cavity portion 61 because molten magnesium alloy 42 is flooded from cavity portion 61 to flow into overflow portion 66. As a result, the confluence region is eliminated from the cage. Accordingly, the confluence region including the voids is suppressed from remaining in the cage to result in decreased strength. As such, even in the case where the confluence region is formed in the region thin in thickness in the cage, the present invention can be particularly effectively applied.

It should be noted that in the embodiments described above, the ASTM standard AZ91D is illustrated as the magnesium alloy applicable to the present invention, but the magnesium alloy applicable to the present invention is not limited to this and various types of magnesium alloys for die casting can be used. An example of the magnesium alloy usable in the present invention is an alloy obtained by adding aluminum (Al), zinc (Zn), manganese (Mn), silicon (Si), or the like to magnesium (Mg), which is the main component. For improved incombustibility or improved heat resistance and toughness, calcium (Ca) or gadolinium (Gd), copper (Cu), iron (Fe), nickel (Ni), zirconium (Zr), a rare earth element, or the like may be added thereto as required. Specifically, a Mg—Al—Zn-based alloy such as AZ91D, AZ61A, or AZ31B of the ASTM standard, a Mg—Al-based alloy such as AM60B, a Mg—Al—Si-based alloy such as AS41A, or the like can be employed.

Further, the volume of overflow portion 66 is not particularly limited, but is preferably not less than 5% of the volume of cavity portion 61 in order to securely eliminate the confluence portion from the cage (product), more preferably, is not less than 10% thereof in order to eliminate the confluence portion more securely. On the other hand, in view of material yield, fewer wasted material is more preferable. Hence, it is preferable that the volume of overflow portion 66 is not more than 30% of cavity portion 61.

Further, various methods can be employed to separate (remove), from the cage, the magnesium alloy solidified in each of runner portion 62 and overflow portion 66 in step (S50). A specific exemplary method is machining employing a pressing machine, such as a trimming process, a barrel process, or a cutting process.

There are also methods suitably used therefor, such as a hot nozzle or hot runner method allowing for reduction of an amount of magnesium alloy solidified in sprue portion 63 and runner portion 62, and a molding method employing in-mold gate cut method in which a gate is cut in the mold. It should be noted that the in-mold process is capable of removing not only the magnesium alloy solidified in sprue portion 63 and runner portion 62 but also the magnesium alloy solidified in overflow portion 66.

Further, each of cages 14, 24 thus molded may be subjected to one or both of solution treatment and age hardening treatment as required.

Further, the surface treatment can be performed before or after removing the magnesium alloy solidified in each of sprue portion 63, runner portion 62, and overflow portion 66, but it is preferable to perform the surface treatment after the removal thereof. Exemplary specific surface treatments are as follows: plating treatment employing a metal excellent in corrosion resistance; resin coating such as the cation electrodeposition coating; chemical conversion treatment or anodizing for altering the surface into magnesium hydroxide or magnesium oxide. Among these, it is particularly preferable to employ the anodizing providing excellent corrosion resistance and wear resistance without adhesion of interface; or the cation electrodeposition coating providing excellent corrosion resistance and self lubricity. It should be noted that the anodizing is likely to result in a large surface roughness. Hence, the following treatment may be performed as required after the surface treatment: polishing treatment such as barrel polishing; sealing by a resin material or sealing by steam treatment, boiling water treatment, or chemical treatment using a nickel acetate solution; or overcoat treatment. If the polishing treatment is performed, an amount of polishing can be equal to or smaller than the thickness of the alteration layer in order to leave the alteration layer formed through the surface treatment. When the alteration layer has a thickness of approximately 3 μm or greater, a big problem does not take place in terms of functionality, but the thickness thereof is preferably 5 μm or greater in terms of durability because the cage has a sliding portion in contact with a rolling element or a bearing ring. It should be noted that as the alteration layer is thicker in thickness, the wear resistance and corrosion resistance become more excellent. However, growth of recesses (increased surface roughness) and change in the shape such as volumetric expansion, both of which are involved in the alteration, become also greater. Accordingly, the thickness is preferably 15 μm or smaller, and is particularly preferably 10 μm or smaller.

Further, when performing plating treatment as the surface treatment, it is preferable to employ various types of nickel plating such as chrome plating, electroless nickel plating, and electro nickel plating.

Further, the cage of the present invention may be of various shapes such as a crown-shaped cage, a machined cage, a comb-shaped cage, and a window type cage and is not particularly limited in terms of its shape. Among these, the cage of the present invention can be suitably used for the comb-shaped cage or the crown-shaped cage, both of which are required to have a high rigidity. Further, the cage of the present invention is applicable to rolling bearings of various types such as a radial ball bearing, a radial roller bearing, a ball thrust bearing, a thrust roller bearing, and an angular contact ball bearing, and can be suitably employed without a particular limitation in a type of rolling bearing. Further, a type of guide in the cage is not particularly limited and the present invention can be applied to any type of guide such as a rolling element guide, an outer ring guide, and an inner ring guide.

Third Embodiment

Figure 10:
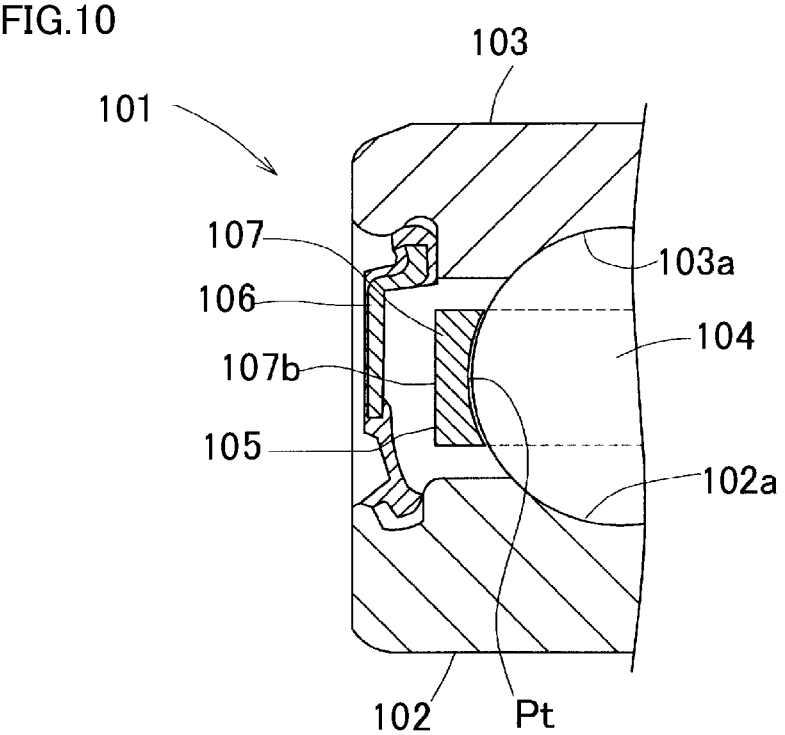
FIG. 10 is a cross sectional view of a rolling bearing according to one embodiment of the present invention.
Figure 11A:
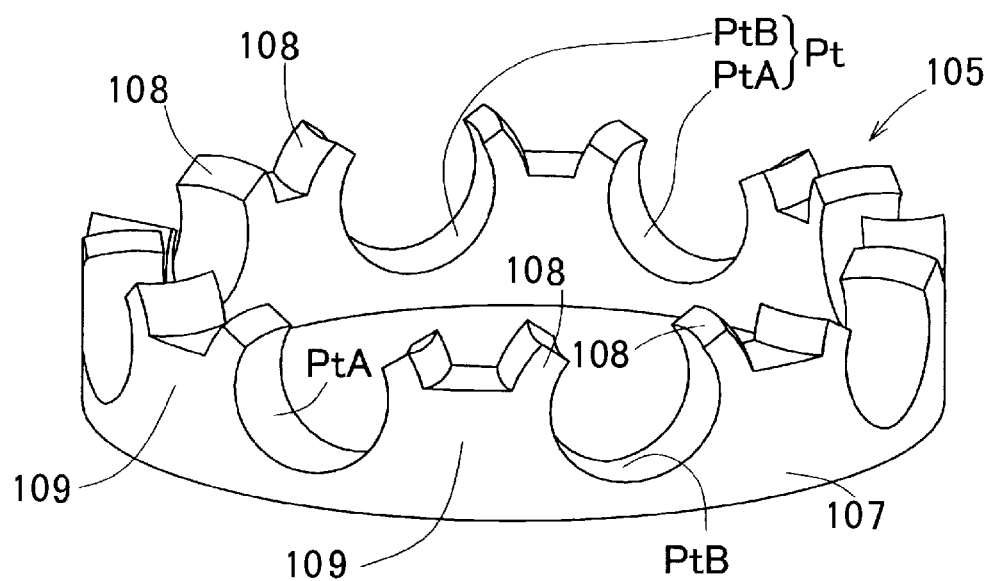
FIG. 11A is a perspective view of the cage of the rolling bearing.
Figure 11B:
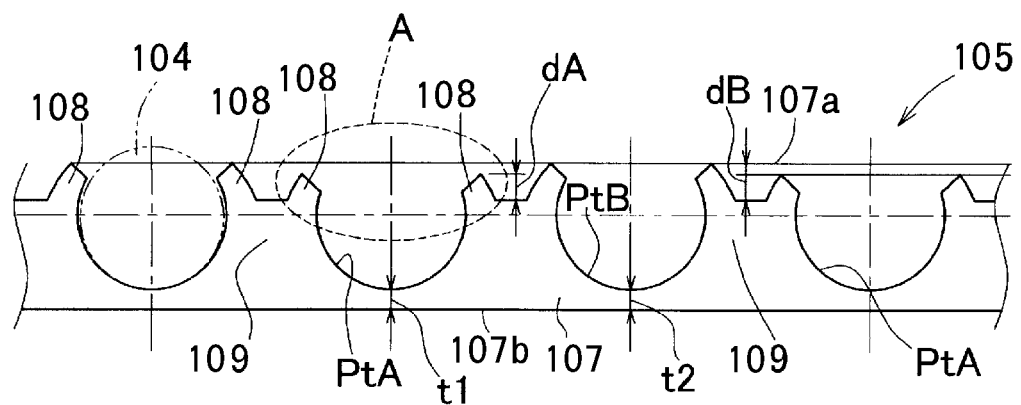
FIG. 11B is an exploded cross sectional view of the cage when taken along a cylindrical plane including a pitch circle.

The following describes one embodiment of the present invention with reference to FIG. 10, FIG. 11A, and FIG. 11B. As shown in FIG. 10, a rolling bearing 101 according to this embodiment is a sealed type of a deep groove ball bearing, and includes an inner ring 102, an outer ring 103, a plurality of balls 104, a cage 105, and seal members 106, 106 sealing a bearing space between inner and outer rings 102, 103. It should be noted that one or both of seal members 106 can be omitted in the deep groove ball bearing. In FIG. 10, a contact seal is illustrated as each of seal members 106, but a non-contact seal may be employed. Further, seal members 106 each formed of a metal plate may be provided. Outer ring 103 has a raceway surface 103a at its inner circumference. Inner ring 102 has a raceway surface 102a opposite to raceway surface 103a. Between these raceway surfaces 102a, 103a, the plurality of balls 104 are provided and are held by cage 105. Grease or the like may be provided in the bearing space as a lubricant. Each of balls 104 is formed of a steel ball, for example.

The following describes cage 105. As shown in FIG. 10, FIG. 11A, and FIG. 11B, cage 105 is in the form of a crown having a plurality of pockets Pt that have opening portions in one side surface 107a of an annular body 107 thereof to hold balls 104 therein and that are arranged at a plurality of locations in annular body 107 in the circumferential direction. This cage 105 is formed by means of injection molding of a magnesium alloy, for example. Further, cage 105 is configured in the rolling element-guided manner in which each of pockets Pt has an inner surface constituted of a spherical surface having monotonous and constant curvature and receives ball 104 therein to provide constraint thereof in the axial direction, the radial direction, and the circumferential direction.

A pair of tabs 108, 108 are provided for each of pockets Pt of annular body 107 to axially project from the circumferential ends of pocket Pt in the side surface at the opening side of pocket Pt. The pair of tabs 108, 108 are face to face with each other in the circumferential direction, and constitutes a portion of pocket Pt therebetween. In other words, the inner surfaces of the pair of tabs 108, 108 have the same center of curvature as the center of curvature of a spherical surface forming the bottom surface of the pocket, and are formed along a spherical surface having the same curvature radius as that of the spherical surface forming the bottom surface of the pocket. In annular body 107, an annular portion 109 between pockets Pt, Pt adjacent to each other in the circumferential direction serves as a connection portion that connects cage 105 in an annular manner. Annular body 107 has an other side surface 107b having no pocket Pt provided therein and located at a rear side relative to the pocket. Other side surface 107b is provided along a plane perpendicular to the axial direction.

Each of a pair of tabs 108, 108 of a pocket Pt in a portion A in FIG. 11B projects at an axial projection amount dA lower than an axial projection amount dB of each of tabs 108, 108 of a pocket Pt adjacent thereto in the circumferential direction. As shown in FIG. 11A and FIG. 11B, in cage 105, pockets PtA having tabs 108, 108 projecting at such a low axial projection amount and pockets PtB having tabs 108, 108 projecting at the axial projection amount higher than the axial projection amount of each of tabs 108, 108 of pockets PtA are provided alternately in the circumferential direction. It should be noted that the axial projection amount of tabs 108, 108 of each of pockets PtB is the same as that of conventional tabs. Tabs 108, 108 of each of pockets PtA are provided to extend from the inner diameter side portion to the outer diameter side portion of one side surface 107a of annular body 107. Also, tabs 108, 108 of each of pockets PtB are provided to extend from the inner diameter side portion to the outer diameter side portion of one side surface 107a of annular body 107.

Further, a thickness t1 between the pocket bottom surface of pocket PtA and other side surface 107b of annular body 107 is formed to be equal to a thickness t2 between the pocket bottom surface of pocket PtB and other side surface 107b of annular body 107. The center of curvature of pocket PtA and the center of curvature of pocket PtB are set at locations at the same height in the axial direction in annular body 107. The curvature radiuses of pockets PtA, PtB are set to be the same. Accordingly, pockets PtA, PtB are formed without deviations.

According to the configuration described above, the pair of tabs 108, 108 in pocket PtA project at axial projection amount dA lower than axial projection amount dB of the pair of tabs 108, 108 of pocket PtB in cage 105. Accordingly, a magnesium alloy having a strength higher than that of a resin material or the like can be applied. With such an axial projection amount dA of tabs 108, 108 of pocket PtA being lower than tabs 108, 108 of pocket PtB as described above, even a crown-shaped cage to which the magnesium alloy is applied can be readily extracted from a mold in injection molding. Insertion of balls 104 to pockets Pt is facilitated during assembly.

Accordingly, as compared with a cage made of a resin material, the cage achieves higher strength and higher heat resistance. As compared with a cage made of an iron plate material, cage 105 can achieve a high degree of freedom in shape, ease of assembly, and a light weight. Accordingly, a rolling bearing can be realized which contributes to energy saving, can be used under high-speed rotation, and achieves reduced manufacturing cost.

Fourth Embodiment

The following describes another embodiment of the present invention. In the description below, portions corresponding to the matters described with regard to each of the foregoing embodiments are given the same reference characters and are not described repeatedly. In the case where only a part of a configuration is described, it is assumed that the other part of the configuration is the same as that in the foregoing embodiment(s). Not only a combination of the portions specifically described in each of the embodiments but also a partial combination of the embodiments can be made as long as the combination does not cause a particular problem.

Figure 12A:
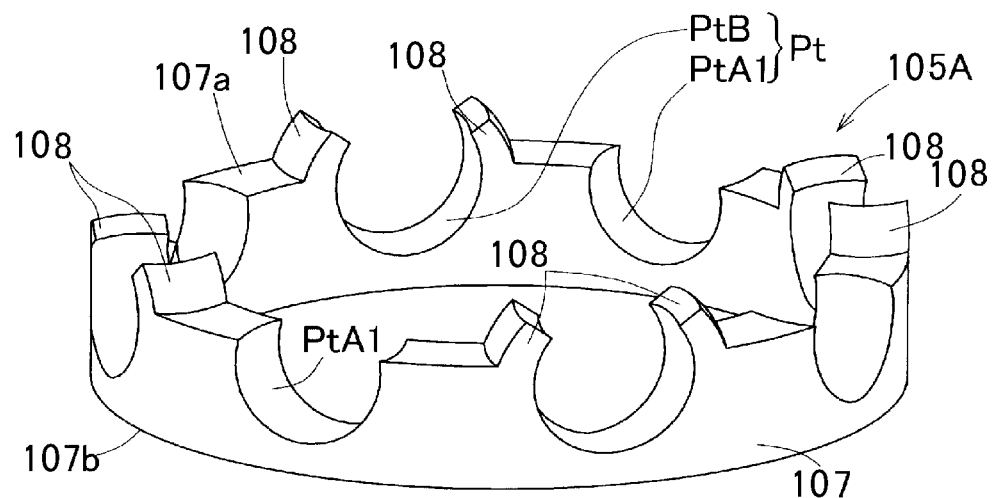
FIG. 12A is a perspective view of a cage of a rolling bearing in another embodiment of the present invention.
Figure 12B:
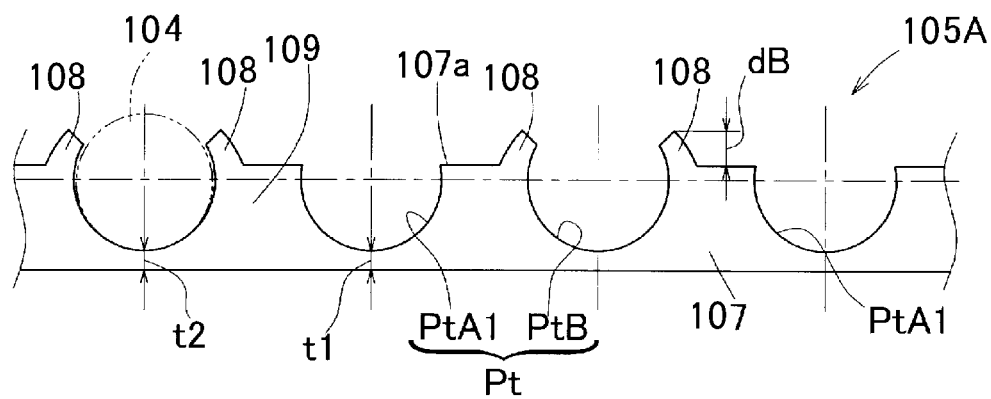
FIG. 12B is an exploded cross sectional view of the cage when taken along a cylindrical plane including a pitch circle.

As shown in FIG. 12A and FIG. 12B, in the crown-shaped cage, only part of pockets Pt located at the plurality of locations may be each provided with the pair of tabs 108, 108 constituting portions of pocket Pt. In this cage 105A, pockets PtA1 provided with no tabs 108, 108 and pockets PtB provided with tabs 108, 108 projecting at the same axial projection amount as that in the conventional one are provided alternately in the circumferential direction. Apart from this, the cage is configured in the same manner as that of FIG. 11A and FIG. 11B.

According to the configuration of FIG. 12A and FIG. 12B, in the crown-shaped cage, only each of pockets PtB is provided with the pair of tabs 108, 108, and each of the other pockets PtA1 is not provided with tabs 108, 108. Hence, even a crown-shaped cage to which a magnesium alloy or the like is applied can be readily extracted from a mold in injection molding. Insertion of balls 104 to pockets Pt during assembly is further facilitated as compared with cage 105 in FIG. 11A and FIG. 11B. Apart from this, the same effect as that of each of the foregoing configurations is exhibited.

Figure 13A:
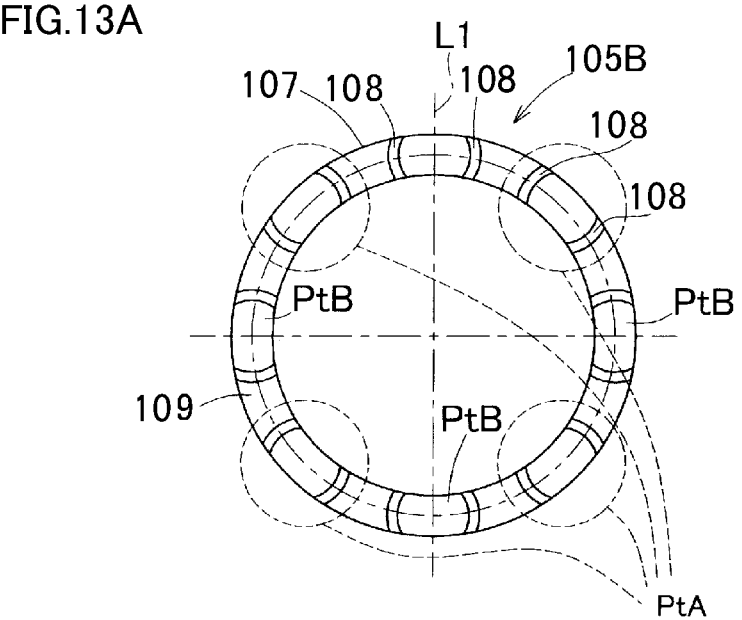
FIG. 13A is a plan view of a cage (example with eight pockets) of a rolling bearing in still another embodiment of the present invention.
Figure 13B:
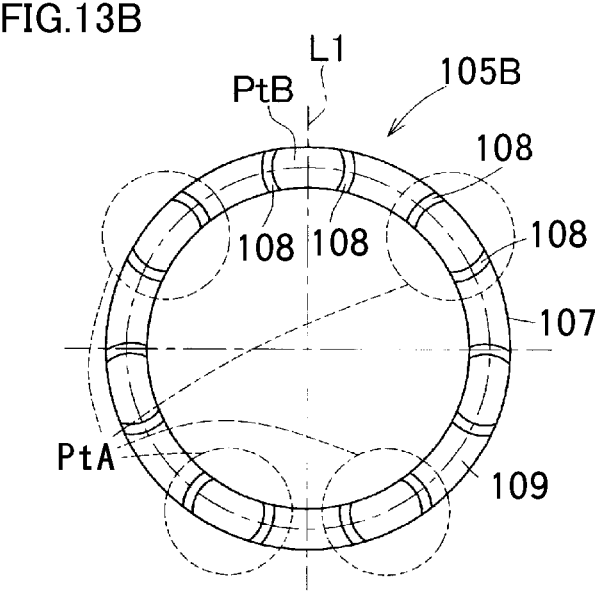
FIG. 13b is a plan view of a cage (example with seven pockets) of a rolling bearing in still another embodiment of the present invention.

As shown in FIG. 13A and FIG. 13B, in a crown-shaped cage, pockets PtA each having tabs 108, 108 projecting at a low axial projection amount may be provided symmetrically relative to a plane L1 including the axial direction of the cage. In the example of FIG. 13A, a crown-shaped cage 105B having eight pockets Pt in total is illustrated. In the example of FIG. 13B, a crown-shaped cage 105B having seven pockets Pt in total is illustrated. According to these configurations, each of the cages can be prevented from being undesirably inclined or being displaced in the bearing. Accordingly, high-speed rotation of the bearing can be further facilitated.

Figure 14A:
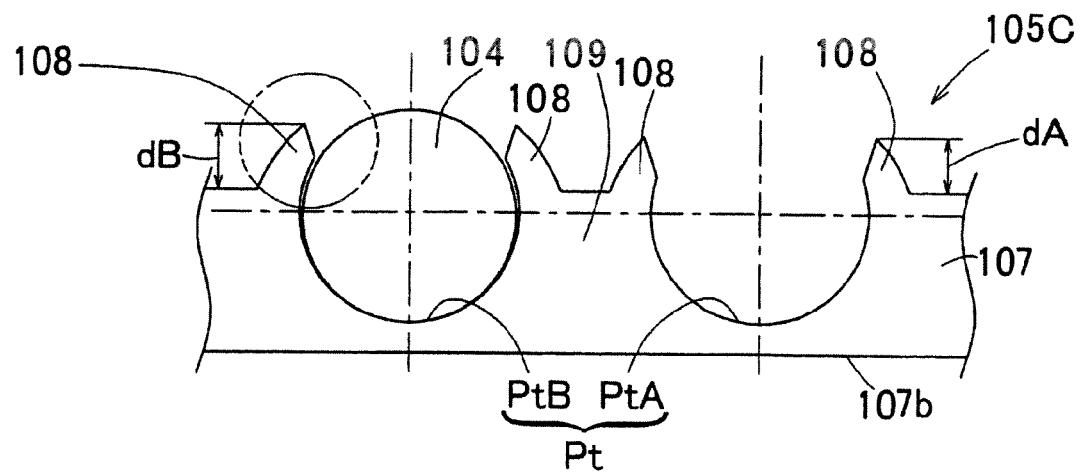
FIG. 14A is an enlarged view of main portions of a cage of a rolling bearing in still another embodiment of the present invention.
Figure 14B:
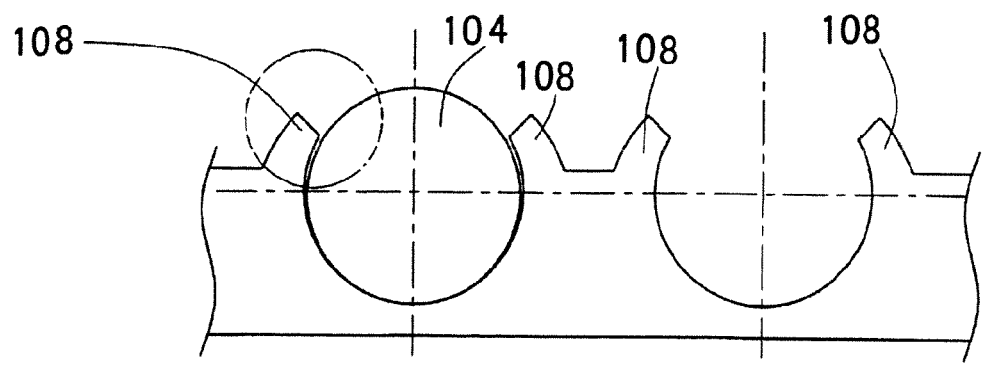
FIG. 14B is an enlarged view of main portions of a conventional cage.

As shown in FIG. 14A, in a crown-shaped cage, each of tabs 108 may have a narrowing shape such that its circumferential thickness becomes thinner as it extends in the axial direction toward the tip. In this example, each of the pair of tabs 108, 108 in pocket PtA is configured to have the above-described narrowing shape, i.e., tapered shape. Likewise, each of tabs 108, 108 of pocket PtB, i.e., tabs 108, 108 projecting at axial projection amount dB greater than axial projection amount dA of tabs 108, 108 of pockets PtA is configured to have the above-described narrowing shape. In this case, the tip of each of tabs 108, 108 can be elastically deformed more readily than that of conventional tab 108 in FIG. 14B. This facilitates insertion of balls 104 to pockets Pt as compared with that in the conventional cage, thereby reducing the number of steps in manufacturing. In this case, the thickness of the tip of tab 108 is thinner than that in the conventional cage. However, a magnesium alloy or the like having a higher strength than that of a resin material or the like can be applied, whereby cage 105C having tabs 108 having their tips of thin thickness can be practically used.

Figure 15:
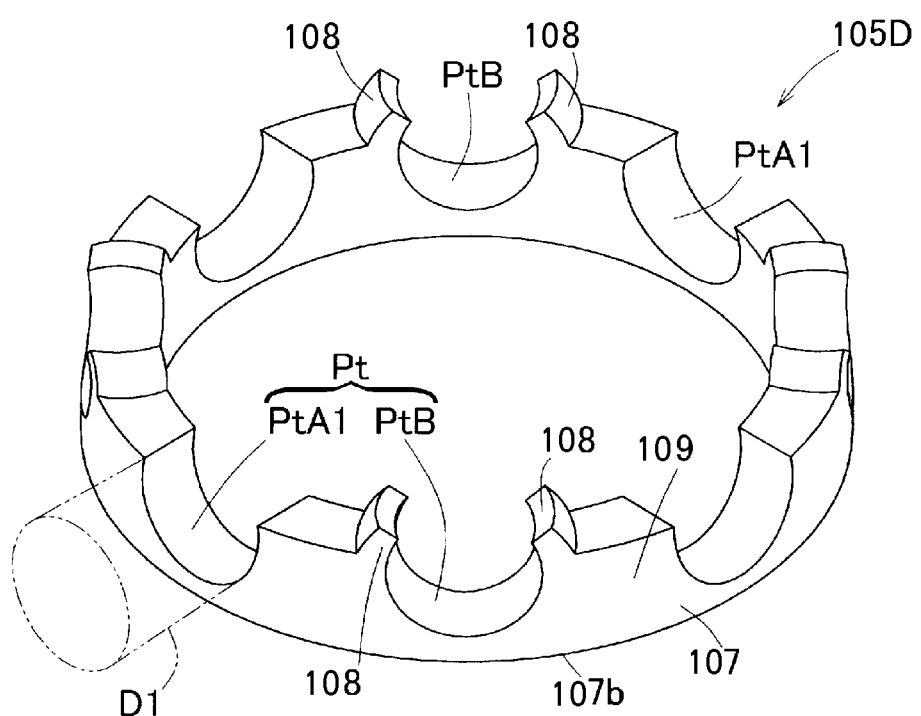
FIG. 15 is a perspective view of a cage of a rolling bearing in still another embodiment of the present invention.

In FIG. 15, a crown-shaped cage 105D is configured such that in the configuration of FIG. 12A and FIG. 12B, the inner surface of each of pockets PtA1 provided with no tabs 108, 108 has a cylindrical shape D1 along the radial direction and the inner surface of each of pockets PtB provided with tabs 108, 108 has a spherical surface shape. A rolling element is guided by pocket PtB, so that the inner surface of pocket PtA1 can have cylindrical shape D1 along the radial direction. In this case, part of balls in the rolling bearing, i.e., balls inserted into pockets PtA1 can be constrained only in the circumferential direction. In this way, a frictional resistance between the cage and each of the balls can be reduced as compared with that in the conventional art.

Conversely to the above-described configuration, the inner surface of each of pockets PtA1 provided with no tabs 108, 108 may be configured to have the spherical surface shape, and the inner surface of each of pockets PtB provided with tabs 108, 108 may be configured to have a cylindrical shape along the radial direction. In this case, cage 105A is constrained in the axial direction by tabs 108, 108 of each pocket PtB, and cage 105A is constrained in the radial direction and the circumferential direction by the spherical surface of each pocket PtA1.

Figure 16A:
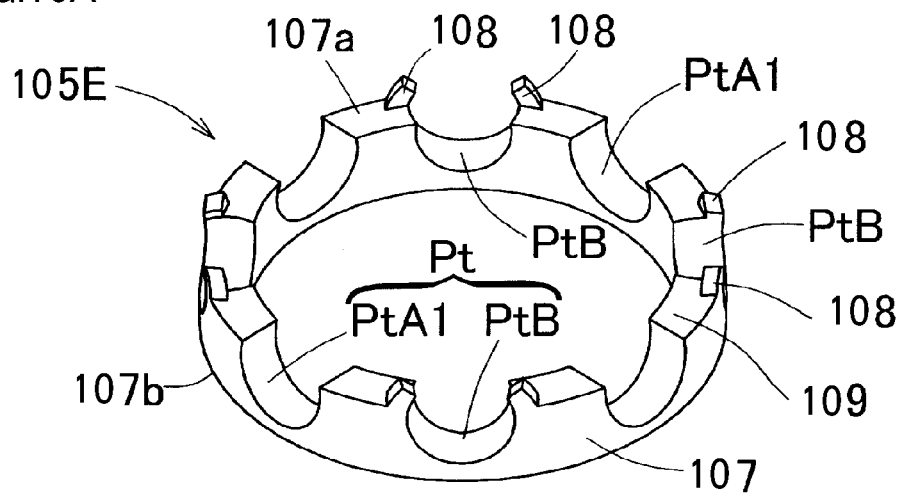
FIG. 16A is a perspective view of a cage of a rolling bearing in still another embodiment of the present invention.

As shown in FIG. 16A, each of tabs 108, 108 of pockets PtB may be provided to have a width size corresponding to part of the radial width of one side surface 107a of annular body 107 and be shifted to the outer diameter side. In this figure, a crown-shaped cage 105E is configured such that in the configuration of FIG. 12A and FIG. 12B, tabs 108, 108 of each of pockets PtB are provided only in the outer diameter side portion of one side surface 107a of annular body 107, for example. In this case, during an operation of the bearing, grease is never scraped by the inner diameter side portion of the cage. Hence, grease leakage can be prevented during rotation of the outer ring, in particular.

Figure 16B:
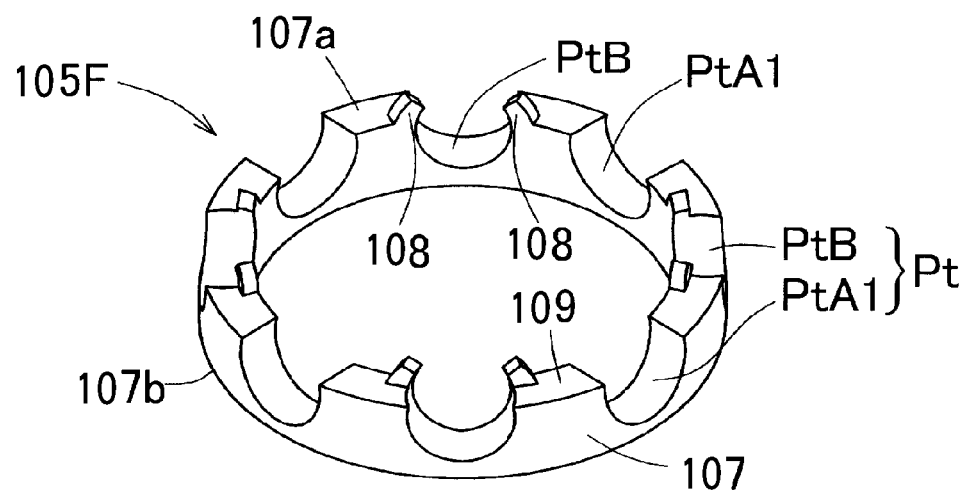
FIG. 16B is a perspective view of a cage of a rolling bearing in still another embodiment of the present invention.

As shown in FIG. 16B, each of tabs 108, 108 of pockets PtB may be provided to have a width size corresponding to part of the radial width of one side surface 107a of annular body 107 and be shifted to the inner diameter side. In this figure, a crown-shaped cage 105F is configured such that in the configuration of FIG. 12A and FIG. 12B, tabs 108, 108 of each of pockets PtB are provided only in the inner diameter side portion of one side surface 107a of annular body 107, for example. In this case, even if tabs 108, 108 are deformed by centrifugal force during high-speed rotation, the balls can be guided.

Figure 17:
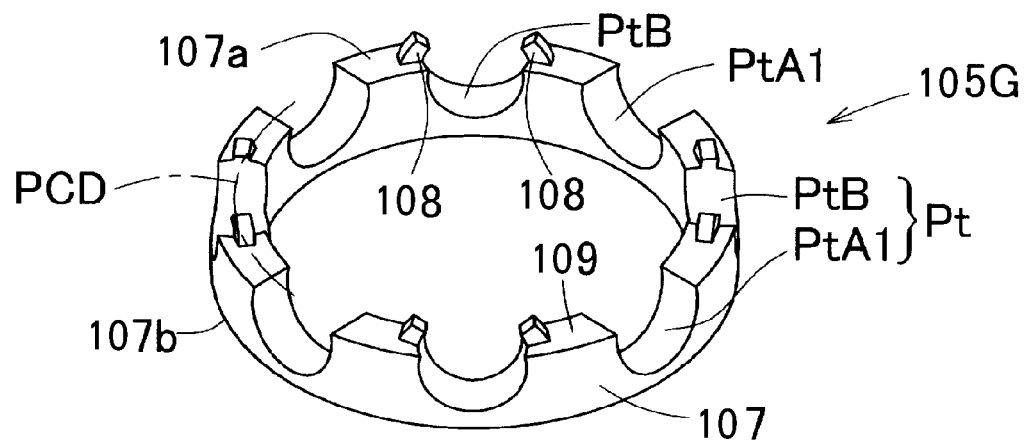
FIG. 17 is a perspective view of a cage of a rolling bearing in still another embodiment of the present invention.

In FIG. 17, a crown-shaped cage 105G is configured such that in the configuration of FIG. 12A and FIG. 12B, tabs 108, 108 of each of pockets PtB are provided only in a cage pitch diameter PCD portion of one side surface 107a of annular body 107, for example. In this case, similar constraint can be obtained even when a space between each ball and each pocket Pt is made larger than that in a cage in which the ball is constrained in a location other than the cage pitch diameter. This leads to decreased drag torque of grease.

Figure 18:
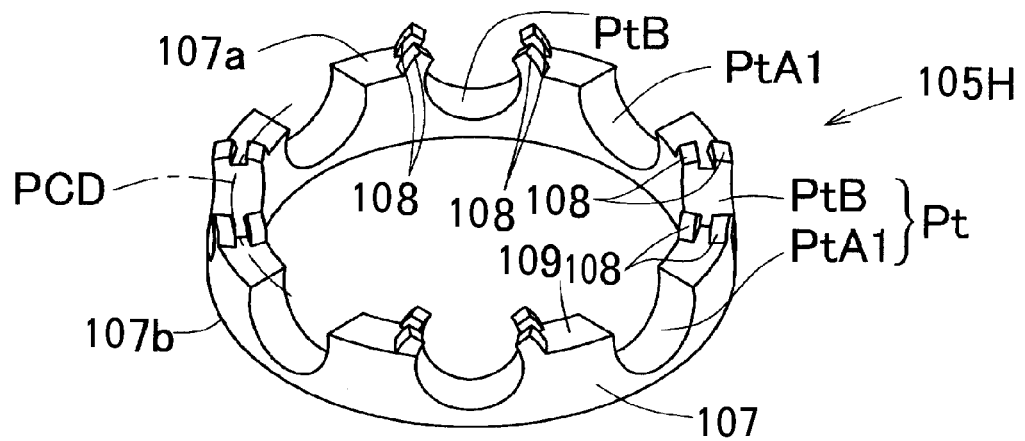
FIG. 18 is a perspective view of a cage of a rolling bearing in still another embodiment of the present invention.

Conversely to FIG. 17, in FIG. 18, a crown-shaped cage 105H is configured such that tabs 108, 108 of each of pockets PtB are provided only in the outer diameter side and the inner diameter side of one side surface 107a of annular body 107. Namely, pocket PtB is shaped such that tabs 108, 108 are not provided only in the cage pitch diameter PCD portion at one side surface 107a of annular body 107. In this case, even when the space between the ball and the cage becomes small during the operation of the bearing, a torque reduction effect can be obtained during the operation of the bearing because the portion mainly attributed to increase of torque, i.e., the portion between the outer diameter side portion and the inner diameter side portion in one side surface 107a of annular body 107 has been removed.

Figure 19:
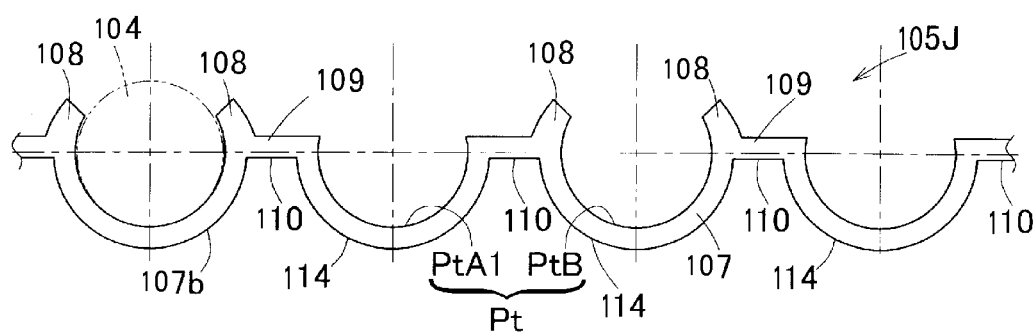
FIG. 19 is a cross sectional view of main portions of a cage of a rolling bearing in still another embodiment of the present invention.

In FIG. 19, a crown-shaped cage 105J is configured such that the other side surface of annular body 107, i.e., the side surface not provided with pockets Pt has a wave shape having a recess 110 between each pocket PtA1 and each pocket PtB. In the other side surface of annular body 107, each of locations 114 corresponding to pockets PtA1 and pockets PtB is formed to have a spherical surface shape having a certain thickness relative to the inner surfaces of pockets PtA1 and pockets PtB. In the other side surface of annular body 107, recesses 110 and locations 114 are connected in the circumferential direction to form the wave shape. In other words, the crown-shaped cage is injection-molded to particularly provide annular body 107 with the other side surface having the wave shape such as that in a wave-shaped cage formed of an iron plate. In this case, the material and weight of the cage can be reduced. In the example of FIG. 19, other side surface 107b of annular body 107 is provided with recesses 110 extending from the inner diameter surface to the outer diameter surface, but it is desirable that an amount of recessing is small in view of the strength of the cage. In order to suppress adhesion of grease to the outer diameter surface of the inner ring, it is also effective to provide a long distance between the outer diameter surface of the inner ring and the inner diameter surface of the cage. Hence, for example, a step-like shape may be employed such that recesses 110 are provided only in the inner diameter side between pockets PtA1 and pockets PtB and wall surfaces are adapted to remain in the outer diameter side in a conventional manner.

Figure 20:
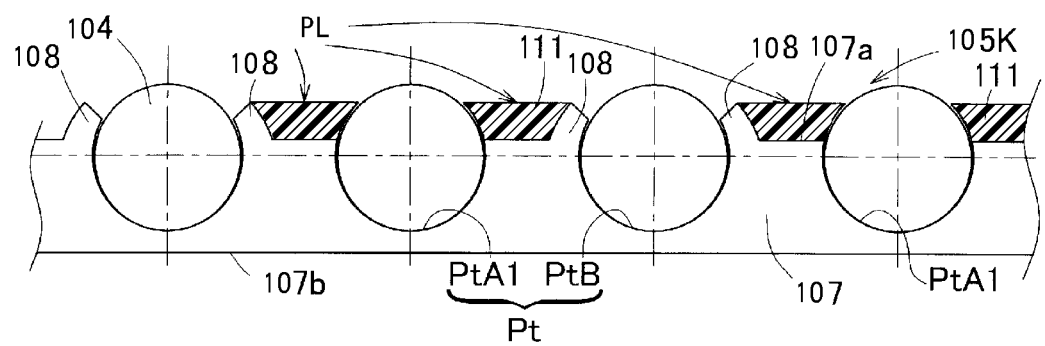
FIG. 20 is a cross sectional view of main portions of a cage of a rolling bearing in still another embodiment of the present invention.

In FIG. 20, a crown-shaped cage 105K is configured such that in the configuration of FIG. 12A and FIG. 12B, a solid lubricant 111 is incorporated onto one side surface 107a of annular body 107. As solid lubricant 111, for example, there can be used a thermally cured grease (such as "PolyLube®") having grease mixed in a synthetic resin material such as an ultrahigh molecular weight polyethylene. The thermally cured grease is obtained by, for example, heating and solidifying a mixture of 1-95 weight %, preferably not less than 30 weight %, of polyethylene and 99-5 weight % of a lubricant grease with a soap or non-soap thickener. (See Japanese Patent Laying-Open No. 55-137198 (Patent Literature 8)).

Solid lubricant 111 is provided on one side surface 107a of annular body 107 to constitute a portion of each pocket PtA1, and is formed in flush with the tip of each of tabs 108, 108 of each pocket PtB. Such a solid lubricant 111 can be incorporated in annular body 107 after injection molding. During the operation of the bearing, solid lubricant 111 provides a lubrication effect.

As solid lubricant 111, molybdenum disulfide, tungsten disulfide, graphite, polytetrafluoroethylene, or the like may be provided at least on one side surface 107a of annular body 107 in the same manner as described above.

Figure 21A:
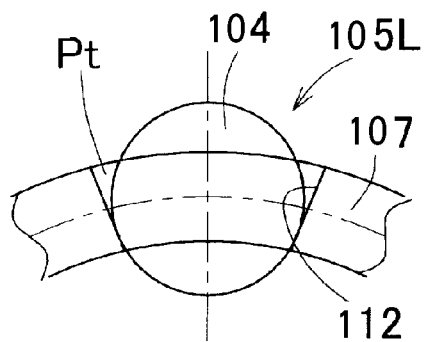
FIG. 21A is an enlarged plan view of a pocket of a cage of a rolling bearing in still another embodiment of the present invention when viewed in the axial direction.
Figure 21B:
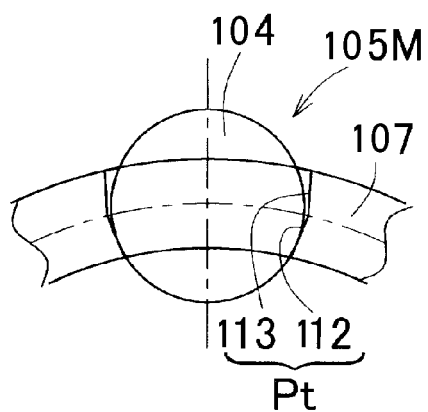
FIG. 21B is an enlarged plan view of a pocket of a cage of a rolling bearing in still another embodiment of the present invention when viewed in the axial direction.
Figure 21C:
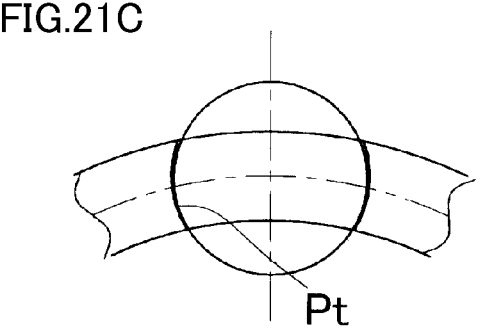
FIG. 21C is an enlarged plan view of a cage's pocket having a spherical surface shape when viewed in the axial direction.

In FIG. 21A and FIG. 21B, each of crown-shaped cages 105L, 105M includes a tapered shape portion 112 in which each of some pockets Pt has an inner diameter getting wider as it extends toward the outer diameter side. In FIG. 21A, the entire pocket constitutes tapered shape portion 112. On the other hand, in FIG. 21B, in each of some pockets Pt, tapered shape portion 112 is formed in a portion of the inner diameter side of pocket Pt, and a cylindrical shape portion 113 having a cylindrical shape is connected to an edge portion of the outer diameter side of tapered shape portion 112. For the sake of reference, a cage having a pocket Pt having a spherical surface shape is shown in FIG. 21C.

According to cages 105L, 105M each having tapered shape portion 112 in pocket Pt, while the bearing is operated, i.e., while centrifugal force is exerted to each of cages 105L, 105M, ball 104 is displaced relative to pocket Pt of each of cages 105L, 105M toward the outer diameter side along tapered shape portion 112. In this way, ball 104 can be constrained in the vicinity of the opening at the inner diameter side of each of cages 105L, 105M.

Figure 22A:
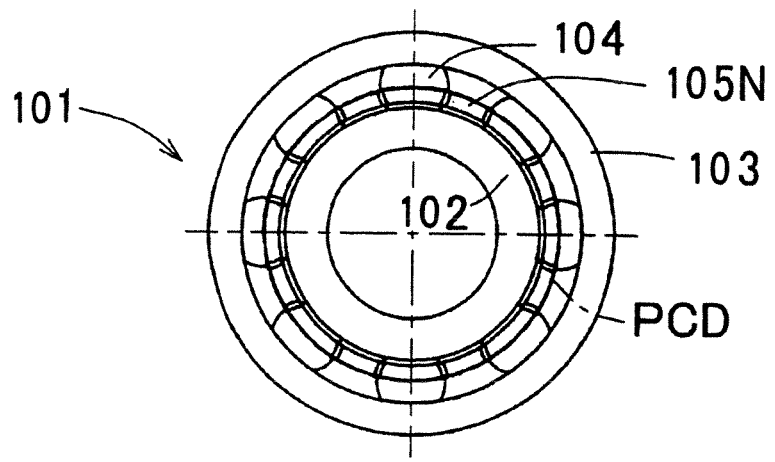
FIG. 22A shows a cage of a rolling bearing in still another embodiment of the present invention when viewed in the axial direction.
Figure 22B:
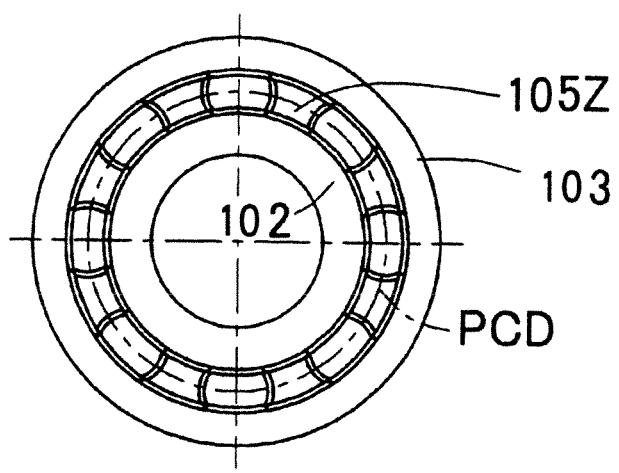
FIG. 22B shows a conventional cage when viewed in the axial direction.

The magnesium alloy is higher in strength than the resin material, and therefore allows the cage to have a reduced cross sectional area. For example, as shown in FIG. 22A, a crown-shaped cage 105N may be provided at the inner diameter side relative to a ball pitch circle PCD. For the sake of reference, FIG. 22B shows a conventional cage 105Z when viewed in the axial direction. A nylon 66 resin containing 25 weight % of glass fiber has a tensile strength of 170 MPa, whereas the magnesium alloy (AZ91D) has a tensile strength of 230 MPa.

In the case where cage 105N exists at the inner diameter side relative to ball pitch circle PCD, deformation of cage 105N toward the outer diameter side can be tolerated during high-speed rotation of the bearing. Thus, it is suitable for high-speed rotation.

Figure 23:
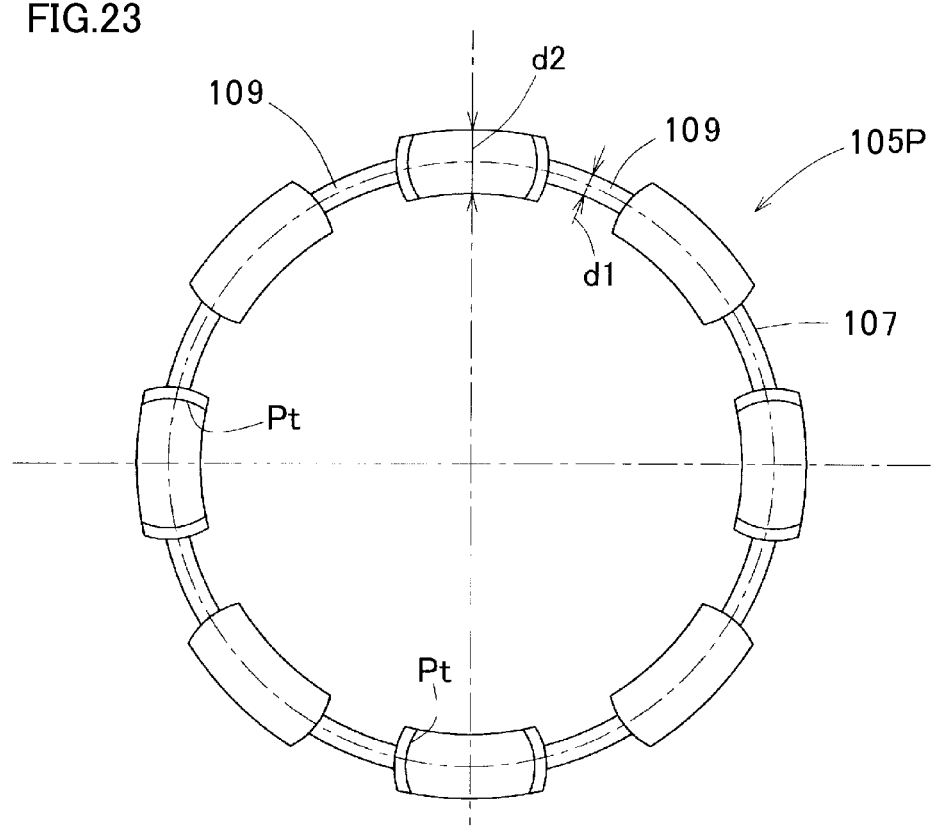
FIG. 23 is a plan view of a cage of a rolling bearing in still another embodiment of the present invention.

In a crown-shaped cage 105P of FIG. 23, only an annular portion 109 of annular body 107 is made small in the radial direction. In other words, annular portion 109 provided between pockets Pt, Pt adjacent to each other in the circumferential direction is adapted to have a radial dimension d1 smaller than a radial dimension d2 of each of pockets Pt. In this case, cage 105P is more likely to be twisted, thereby facilitating assembly of cage 105P into the rolling bearing. Accordingly, the number of manufacturing steps can be reduced.

Figure 24:
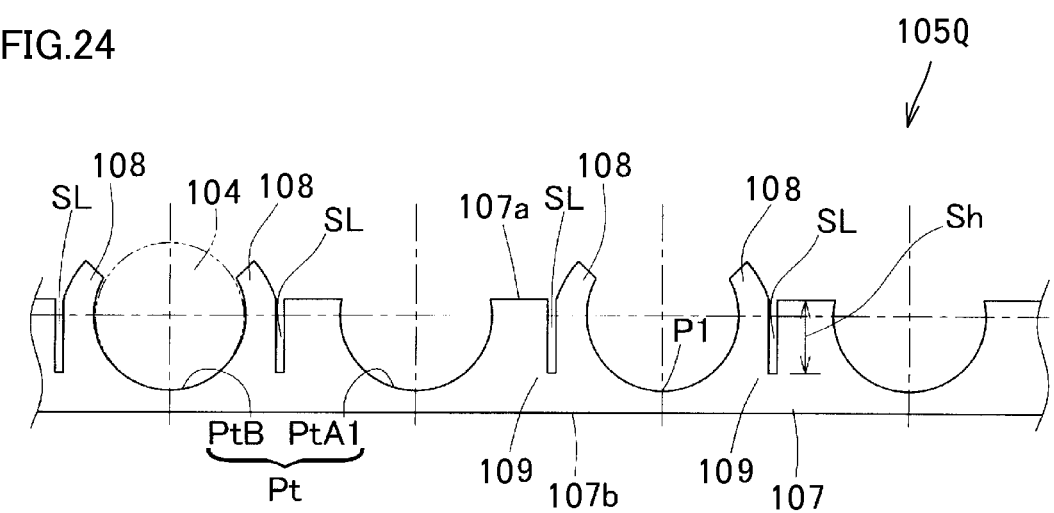
FIG. 24 is a cross sectional view of main portions of a cage of a rolling bearing in still another embodiment of the present invention.

In FIG. 24, in order to facilitate assembly in an improved manner as with the manner described above, a crown-shaped cage 105Q is configured such that recess portions SL each having a slit-like shape are provided in one side surface 107a of annular body 107. Each of recess portions SL is formed in the vicinity of tab 108 in annular portion 109 of annular body 107, and extends from one side surface 107a of annular body 107 in the axial direction. Further, recess portion SL is provided to extend from the inner diameter side portion to the outer diameter side portion of annular portion 109. A slit depth Sh in the axial direction is set to be shallower than a pocket bottom surface P1 of each pocket Pt. Namely, a preferable slit depth Sh is such that a cross sectional area of a location of recess portion SL of crown-shaped cage 105Q along a plane including the axial center of the cage (cross sectional area of the slit portion in the cage) can be larger than a cross sectional area of a location of pocket bottom surface P1 along the above-described plane (cross sectional area of the pocket bottom portion). When the cross sectional area of the slit portion in the cage is larger than the cross sectional area of the pocket bottom portion, no problem arises in terms of strength and filling of a mold upon molding.

Instead of ball 104 formed of a steel ball, a ball 104 may be employed which is formed of a sintered compact of a ceramic such as silicon nitride, alumina, or zirconia. In this case, higher speed can be achieved as compared with a bearing having a generally used steel ball incorporated therein. The ball formed of a ceramic is lighter and harder than the steel ball. Hence, particularly when used together with any one of the cages of the present invention, more stable high-speed rotation can be achieved.

As the ceramic sintered material, it is preferable to use a silicon nitride-based material (density of 3.5 g/cm³ or smaller) having an excellent fatigue flaking resistance, particularly in view of bearing life and weight reduction.

When a sialon ceramic ball manufactured by a combustion synthetic method is used as the silicon nitride-based ceramic rolling element to be incorporated, the manufacturing thereof can be done in an energy saving manner as compared with an ordinary ceramic ball formed of silicon nitride ($Si_3N_4$), and the composition thereof allows for further weight reduction to a density of approximately 3.1-3.3 g/cm³, for example. Accordingly, environmental burden can be further suppressed when manufacturing bearings. The chemical composition of sialon is generally represented as $Si_{6-Z}Al_ZO_ZN_{8-Z}$.

The cage formed of the magnesium alloy having a higher strength than that of the resin material can be incorporated into a rolling bearing. Therefore, it is suitable to a high-speed application. By applying the ball formed of the ceramic sintered compact as the rolling element, the bearing can become insulative. In particular, it is suitable for a high-speed motor.

The material of the cage is not limited only to the magnesium alloy. The cage may be an injection-molded product obtained by means of injection molding of a metal material other than the magnesium alloy and lighter in weight than iron. The weight of the cage is smaller than the weight of an iron plate cage, and it is therefore suitable for usage under vibrating conditions. In particular, it is suitable for a bearing for a joint portion of a robot, a hard disk drive pivot, and an application performing high-precision feedback control.

EXAMPLES

Example 1

The following describes Example 1 of the present invention. The cages of the present invention were actually fabricated and an experiment was conducted to compare characteristics thereof with those of conventional cages. The experiment was conducted in the following procedure.

First, a cage illustrated in an embodiment described above was fabricated using the same method as that in the embodiment. The cage was shaped to be a comb-shaped cage, which is usable for the bearing number NN3020 (JIS bearing designation), as shown in FIG. 1 and FIG. 2. More specifically, the cage was formed to have an inner diameter φ of 120 mm, an outer diameter φ of 132 mm, a height of 10.5 mm, an annular portion 14A (see FIG. 2) having a thickness of 2.3 mm, a PCD (Pitch Circle Diameter) φ of 126 mm, and 28 pillars. Further, the cage was manufactured by perfoming steps (S10)-(S60) of the manufacturing method described in the above-described embodiment (see FIG. 7). In step (S10), magnesium alloy chips made of AZ91D were employed as raw material chips. Steps (S20) and (S30) were performed under the following conditions: a nozzle temperature of 610° C., a mold temperature of 250° C., an injection rate of 1200 mm/s, pressure kept at 15 MPa, and a cool time of 10 s.

Further, in step (S50), the magnesium alloy solidified in overflow portion 66 was removed by press molding. Further, in step (S60), barrel polishing was performed. Thereafter, as a post treatment, an age hardening treatment was performed by holding it at 216° C. for 10 hours (JIS T5) (example A).

In addition, another cage was manufactured to have the same shape as that of example A using the same manufacturing steps as well as step (S70), while omitting the age hardening treatment. In step (S70), anodizing was performed to fin in an alteration layer having a thickness of 8 μm. A surface roughness Ra thereof after the anodizing was adjusted to achieve 1.0 μm in the JIS standard. Accordingly, surface roughness Ra was 0.9 μm (example B).

Still another cage was manufactured by employing the same shape and manufacturing steps as those in example B described above and performing electroless nickel plating (film thickness: 10 μm; surface treatment: etching treatment) in step (S70) instead of the anodizing (example C).

Yet another cage was manufactured by employing the same shape and manufacturing steps as those in example B described above and performing cation electrodeposition coating plating (film thickness: 10 μm; surface treatment: chemical conversion treatment) in step (S70) instead of the anodizing (example D).

Meanwhile, for comparison with the examples of the present invention, there were prepared a cage (comparative example A) having the same shape as those of the examples and made of a resin and a cage (comparative example B) having the same shape and made of a high strength brass. In comparative example A, the cage was fabricated by injection-molding, into a PEEK (Poly Ether EtherKeton) material, a resin (PEEK450CA30 provided by Victrex) having a CF (carbon fiber) material added thereto. Specifically, the injection molding was performed under the following conditions: a nozzle temperature of 400° C., a mold temperature of 180° C., an injection rate of 50 mm/s, a pressure kept at 120 MPa, and a cool time of 30 s. Further, as post treatment, annealing treatment was performed by heating it to 200° C. and retaining it for 3 hours. In comparative example B, high strength brass CAC301 was employed as a raw material, and was cut into the above-described shape, thereby fabricating the cage.

The following describes items and results in the experiment. First, an experiment was conducted to actually construct NN3020 bearings using the cages of examples A to D described above. Specifically, each of the bearings was assembled by preparing an inner ring and an outer ring each made of a SUJ2 material of the JIS standard and rolling elements made of silicon nitride, and incorporating two cages of each example with their rear surfaces face each other (see FIG. 1). As a result, the cages of each of examples A to D can be incorporated thereinto without any problem. Further, no defects took place in the alteration layer, the nickel plating layer, and the cation electrodeposition coating layer formed in the cages of examples B to D.

Figure 25:
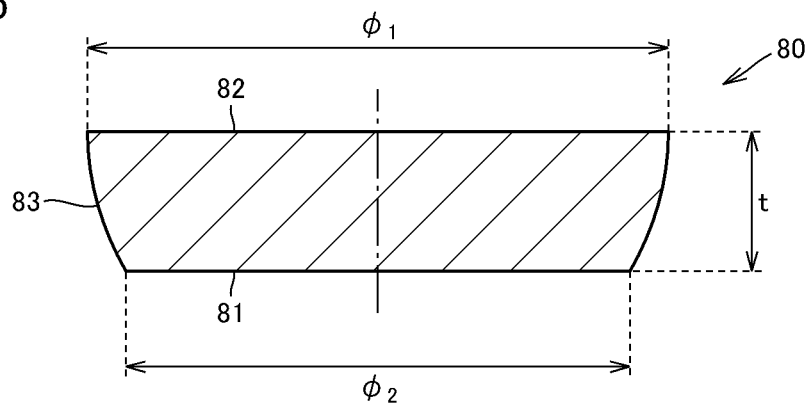
FIG. 25 is a schematic cross sectional view showing a configuration of a jig for use in an experiment.

Next, each of the cages of the examples and the comparative examples was measured for a cage mass, a cage strength, an pillar deflection amount, and a friction coefficient relative to a JIS standard SUJ2 material. The cage strength was measured by recording a load when the cage is broken by pulling the cage with opposing forces applied from the inner diameter side of the cage in the radial direction of the cage. The pillar deflection amount was measured by measuring an amount of collapse of the pillar (amount of change in outer diameter) when applying a constant load to push a jig shown in FIG. 25 to insert its smaller diameter side (diameter $\phi_2$ side) into the inner diameter side of the cage placed on a flat surface with the annular portion of the cage facing downward. Here, referring to FIG. 25, jig 80 includes: a first flat surface 82 having a circular shape with a diameter $\phi_1$ (132 mm); a second flat surface 81 parallel to first flat surface 82 and having a circular shape with a diameter $\phi_2$ (115.5 mm); and a side surface 83 that is a spherical surface having a curvature radius of 66 mm. A thickness t, i.e., a distance between first flat surface 82 and second flat surface 81 is 32 mm. Regarding the friction coefficient relative to the SUJ2 material, a member made of SUJ2 was prepared and a friction coefficient relative to this member under mineral oil (VG2) spraying was measured.

TABLE 1

|  | Example A | Example B | Example C | Example D | Comparative Example A | Comparative Example B |
|---|---|---|---|---|---|---|
| Material | AZ91D | AZ91D | AZ91D | AZ91D | PEEK/CF | CAC301 |
| Manufacturing Method | Injection Molding | Injection Molding | Injection Molding | Injection Molding | Injection Molding | Machining |
| Surface Treatment | N/A | Anodizing (Film Thickness: 8 μm) | Electroless Nickel Plating (Film Thickness: 10 μm) | Cation Electrodeposition Coating (Film Thickness: 10 μm) | N/A | N/A |
| Mass Ratio | 0.2 | 0.2 | 0.2 | 0.2 | 0.2 | 1.0 |
| Strength Ratio | 1.1 | 1.1 | 1.1 | 1.1 | 1.0 | 1.9 |
| Pillar Deflection Amount Ratio | 0.4 | 0.4 | 0.4 | 0.4 | 1.0 | 0.3 |
| Friction Coefficient relative to SUJ2 | 0.25 | 0.16 | 0.11 | 0.13 | 0.11 | 0.30 |

Table 1 shows results of the experiment. Table 1 shows cage masses in mass ratio, assuming that a cage mass of comparative example B is 1. Also, Table 1 shows cage strengths and pillar deflection amounts in strength ratio and pillar deflection amount ratio, assuming that those in comparative example A are 1 respectively.

Referring to Table 1, the mass of each of examples A to D is ⅕ of the cage made of high strength brass in comparative example B. Also, it is confirmed that the cage of the present invention achieved reduced weight as light as that of the cage made of resin in comparative example A. Further, the strength of each of examples A to D exceeds that of the cage made of resin in comparative example A. Further, the pillar deflection amount of each of examples A to D is significantly reduced as compared with the cage made of resin in comparative example A. The value thereof is comparable to the cage made of high strength brass in comparative example B. Further, the friction coefficient of each of examples A to D relative to SUJ2 was smaller than the friction coefficient of comparative example B relative to SUJ2. In particular, the friction coefficient of each of examples C and D relative to SUJ2 was comparable to the friction coefficient of comparative example B, which represented a cage formed of a resin, relative to SUJ2.

From the results of the experiment, it was confirmed that the cage of the present invention can be manufactured by injection molding, which is good for mass production, is light-weighted, has high strength and rigidity, and has a suppressed friction coefficient relative to SUJ2, which is a bearing steel.

Example 2

The following describes Example 2 of the present invention. An experiment was conducted to confirm an improvement effect of the strength by the method for manufacturing the cage in the present invention. The experiment was conducted in the following procedure.

Figure 26:
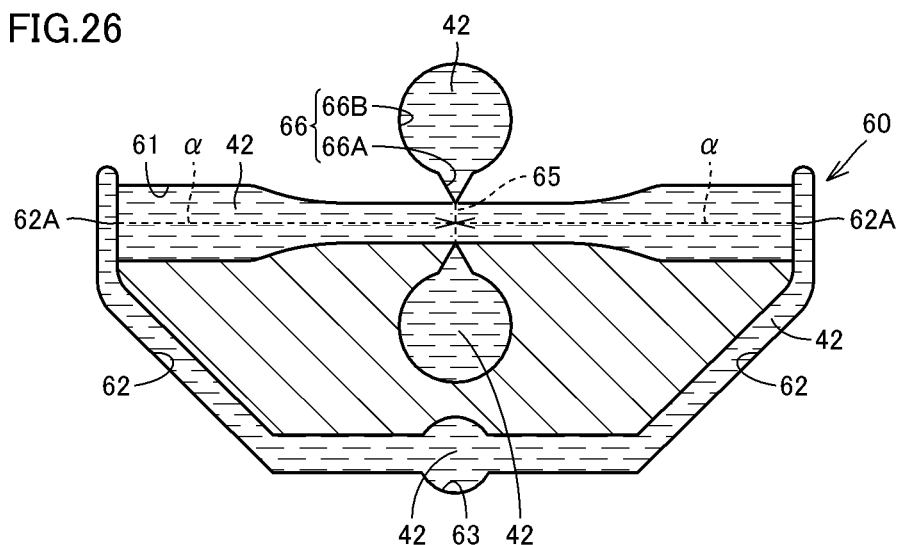
FIG. 26 is a schematic cross sectional view for illustrating a method for manufacturing a test piece in an Example 2.
Figure 27:
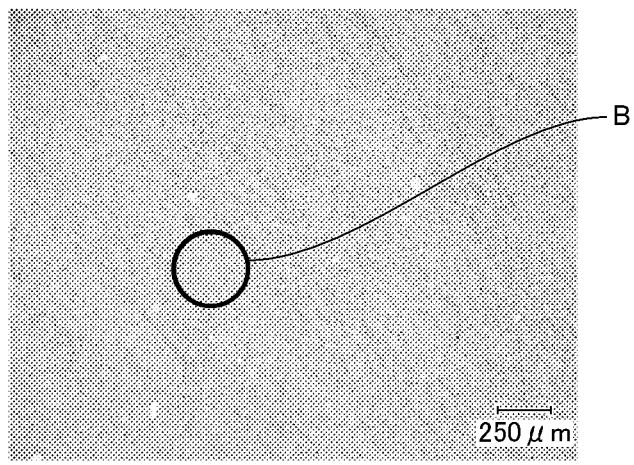
FIG. 27 is an optical microscope photograph showing a texture in an example E.
Figure 28:
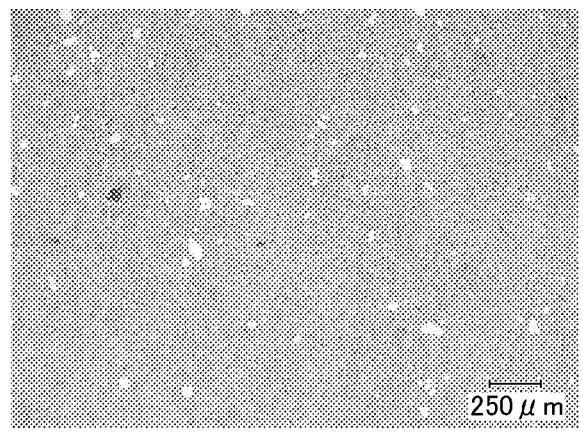
FIG. 28 is an optical microscope photograph showing a texture in an example F.
Figure 29:
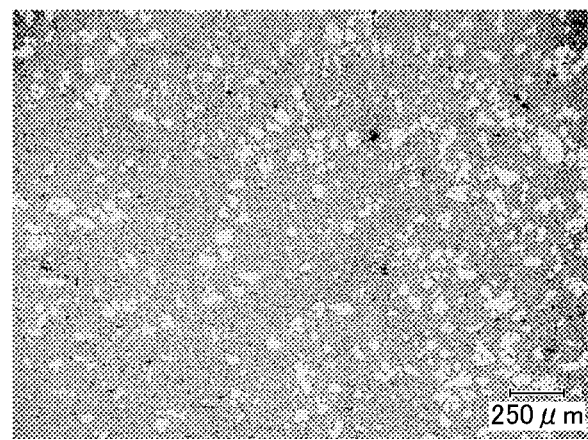
FIG. 29 is an optical microscope photograph showing a texture in an example G.
Figure 30:
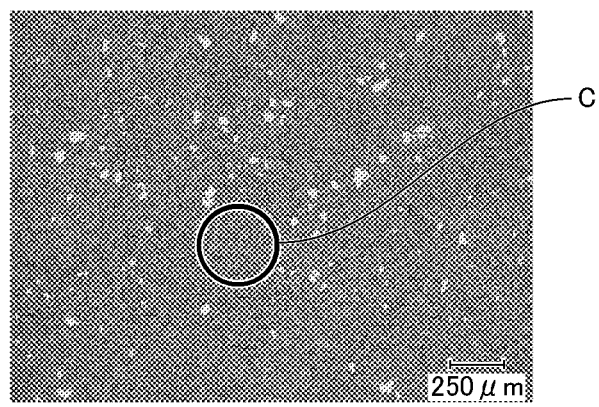
FIG. 30 is an optical microscope photograph showing a texture in an example H.

First, a mold 60 shown in FIG. 26 was used to fabricate a No. 1 test piece (test piece for tensile test) defined in JIS K7113, and an experiment was conducted to check tensile strength of the weld portion. Specifically, referring to FIG. 26, mold 60 includes: a sprue portion 63, which is a hollow region connected to a nozzle for injecting a material; a cavity portion 61 corresponding to the shape of the No. 1 test piece; and runner portions 62 for connecting sprue portion 63 to axial ends of cavity portion 61. Each of runner portions 62 includes a gate portion 62A serving as a film gate. At these two gate portions 62A respectively provided at the axial ends of cavity portion 61, runner portions 62 are connected to cavity portion 61. Cavity portions 61 include a weld region 65, which is a region at which flows of magnesium alloy supplied from runner portions 62 to cavity portions 61 are merged. Mold 60 further includes an overflow portion 66 connected to weld region 65 and storing magnesium alloy having reached weld region 65 and flooded from cavity portion 61. Overflow portion 66 has a discharging portion 66A connected to weld region 65, and a retaining portion 66B connected to discharging portion 66A.

Under conditions shown in Table 2 described below, the material, i.e., AZ91D was injected into mold 60, thereby fabricating test pieces each having a weld portion at its small diameter portion (weld region 65) (examples E to H). In example G, an age hardening treatment was performed by holding it at 150° C. for 24 hours (JIS standard T5). For comparison, a resin (obtained by adding a CF material to a PEEK material; PEEK450CA30 provided by Victrex) was used as the material to fabricate a test piece in a similar manner under the conditions shown in Table 2 (comparative example C). In comparative example C, an annealing treatment was performed as a post treatment to hold it at a temperature of 200° C. for 3 hours. Then, tensile test was conducted in accordance with JIS standard K7113, which is a plastic tensile test method, so as to inspect the tensile strength (corresponding to "weld strength" in Table 2) thereof in the weld portion. A testing rate was 10 mm/min.

Meanwhile, in order to inspect tensile strength of a portion other than the weld portion, a test piece for tensile test was fabricated under the conditions in Table 2 using a mold obtained by forming gate portion 62A only in one axial end of mold 60, and the tensile strength (corresponding to "tensile strength" in Table 2) thereof was inspected.

Figure 31:
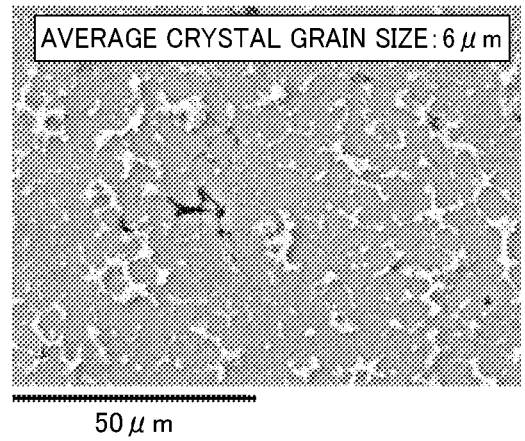
FIG. 31 is an SEM photograph showing a texture in example E.
Figure 32:
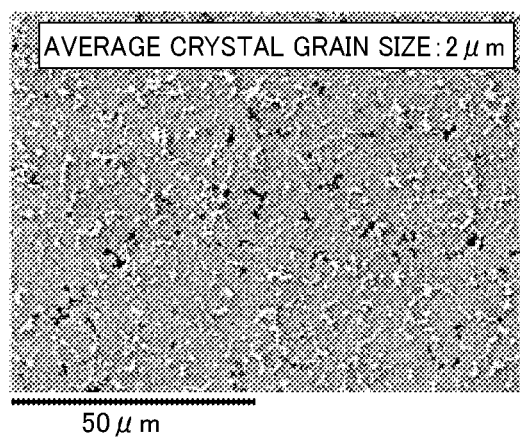
FIG. 32 is an SEM photograph showing a texture in example H.
Figure 33A:
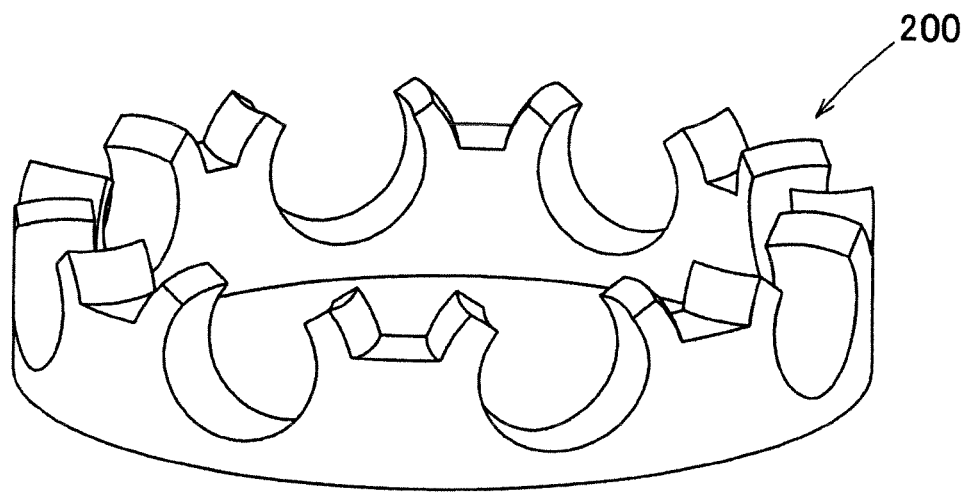
FIG. 33A is a perspective view of a conventional crown-shaped cage.
Figure 33B:
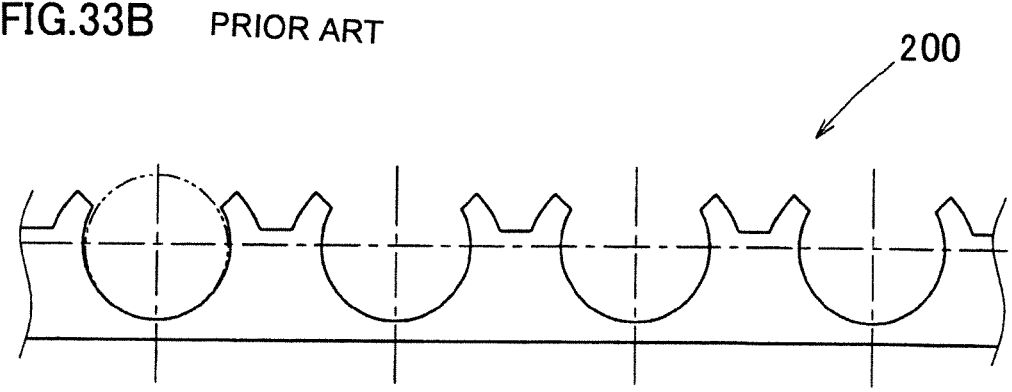
FIG. 33B is a cross sectional view of a crown-shaped cage when taken along a cylindrical plane including a pitch circle.

Further, the obtained test piece for tensile test was cut at its central portion, and then the cross sectional surface thereof was polished. Thereafter, the cross sectional surface was subjected to etching treatment using a 3% nital corrosive liquid (nitric acid alcohol solution). The cross sectional surface after the etching was observed using an optical microscope (with a magnitude of 100). Then, an image obtained through the observation was subjected to binarization processing so as to calculate an area ratio (corresponding to "coarse α solid phase ratio" in Table 2) of coarse α phase having a grain size of 20 μm or greater in a field of view. Optical microscope photographs of cross sectional surfaces of examples E, F, G, and H after the etching are shown in FIG. 27, FIG. 28, FIG. 29, and FIG. 30 respectively. Further, as to examples E and H, regions in which no coarse α phase was observed, such as a region B of FIG. 27 and a region C of FIG. 30, were observed using SEM (Scanning Electron Microscope) (with a magnitude of 1000) (FIG. 31 and FIG. 32). The conditions and results of the experiment are shown in Table 2.

TABLE 2

|  | Example E | Example F | Example G | Example H | Comparative Example C |
|---|---|---|---|---|---|
| Material | AZ91D | AZ91D | AZ91D | AZ91D | Resin |
| Nozzle Temperature | 610° C. | 610° C. | 590° C. | 595° C. | 400° C. |
| Mold Temperature | 200° C. | 250° C. | 250° C. | 160° C. | 180° C. |
| Injection Rate | 2500 mm/s | 1500 mm/s | 1500 mm/s | 3000 mm/s | 50 mm/s |
| Maintained Pressure | 15 MPa | 15 MPa | 15 MPa | 15 MPa | 120 MPa |
| Cooling Time | 10 s | 15 s | 10 s | 10 s | 30 s |
| Tensile Strength | 2.2 | 2.1 | 1.8 | 3.0 | 2.0 |
| Weld Strength | 1.8 | 1.8 | 1.6 | 2.6 | 1.0 |
| Weld Strength/Tensile Strength | 0.8 | 0.9 | 0.9 | 0.9 | 0.5 |
| Coarse α Solid Phase Ratio | 0.8% | 1.7% | 11% | 3.1% | — |

Next, referring to Table 2 and FIG. 27 to FIG. 32, the results of the experiment will be described. In Table 2, the tensile strength and the weld strength are shown in a ratio (relative value), assuming that the weld strength of comparative example C is 1.

Referring to Table 2, the weld strength of each of examples E to H had a value higher than that of comparative example C by 60% or greater. Further, the ratio of the weld strength and the tensile strength was 0.8 or greater, which was a value close to 1. Here, a weld portion is always formed in a cage fabricated using a multipoint gate type injection molding method that employs a mold having a plurality of gates. Further, according to the cage of the present invention, decrease of the strength in the weld portion was significantly suppressed unlike a fiber-reinforced resin material such as comparative example C. Hence, even when the multipoint gate type injection molding is employed, according to the cage of the present invention, a cage having a high strength can be provided.

Because decrease of strength in the weld portion is suppressed, the weld portion can be provided at a portion other than the pillar portion having a large thickness, for example. This provides a wider degree of freedom in design. Specifically, for example, the multipoint gate type injection molding method can be applied to not only a cage holding an even number of rolling elements but also a cage holding an odd number of rolling elements without restrictions in designing.

Further, referring to Table 2, in each of examples E, F, and H, the α solid phase ratio was suppressed to be lower than that in example G, i.e., was less than 5% (less than 2% in examples E and F). Referring to FIG. 27-FIG. 30, each of white color regions in the optical microscope photographs corresponds to the coarse α phase. As a result, the tensile strength in each of examples E, F, and H was higher than that in example G, and was improved by 10% or greater as compared with that in comparative example C. Hence, with the α solid phase ratio being reduced to be less than 5% (here, less than 2%), the cage can be further thinner, thereby achieving reduced weight. From this, the cage of the present invention in which the α solid phase ratio is reduced to be less than 5%, more preferably less than 2%, can be particularly suitably applied to a machine tool bearing required to achieve high-speed rotation through weight reduction, as well as a cage for a bearing in an application of a business machine strongly required to reduce power consumption.

Further, referring to FIG. 31 and FIG. 32, the texture of the matrix in example H is finer than that in example E. More specifically, the matrix in example E had an average crystal grain size of 6 μm, whereas the matrix in example H had an average crystal grain size of 2 μm. As a result, the tensile strength and weld strength in example H were significantly increased as compared with those in example E. From this, in the cage of the present invention, it is preferable to reduce the average crystal grain size of the magnesium alloy constituting the cage. More specifically, the magnesium alloy constituting the cage preferably has an average crystal grain size of 5 μm or smaller, and more preferably 2 μm or smaller.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The cage and the rolling bearing of the present invention can be particularly advantageously applied to a cage required to have a high strength and a rolling bearing having the cage.

REFERENCE SIGNS LIST

1 double-row cylindrical roller bearing; 2 angular contact ball bearing; 11, 21 outer ring; 11A, 21A outer ring raceway surface; 12, 22 inner ring; 12A, 22A inner ring raceway surface; 13 cylindrical roller; 13A roller contact surface; 14, 24 cage; 14A annular portion; 14B pillar portion; 14C surface treatment layer; 23 ball; 23A ball contact surface; 24D weld portion; 41 magnesium alloy chip; 42 magnesium melt alloy; 50 injection portion; 51 cylinder; 52 supplying portion; 53 screw; 54 reservoir; 55 nozzle; 56 heater; 60 mold; 61, 61A, 61B cavity portion; 62 runner portion; 62A gate portion; 63 sprue portion; 65 weld region; 66 overflow portion; 66A discharging portion; 66B retaining portion; 70 injection molding device; 80 jig; 81 second flat surface; 82 first flat surface; 83 side surface; 90 machine tool; 91 main shaft; 91A outer circumferential surface; 91B tip; 92 housing; 92A inner wall; 93 motor; 93A motor stator; 93B motor rotor; 101 rolling bearing; 102 inner ring; 103 outer ring; 104 ball; 105 cage; 107 annular body; 108 tab; 109 annular portion; 112 tapered shape portion; Pt pocket; SL recess portion.

The invention claimed is:

1. A cage holding a rolling element in a rolling bearing, comprising:
   the cage being made of a magnesium alloy,
   the cage being molded by injection molding,
   the cage not having a confluence region including a void formed by merging of flows of said magnesium alloy in a completely molten state,
   wherein in a cross sectional surface of the cage, an area ratio of an α phase having a grain size of 20 μm or greater being less than 15% in said magnesium alloy,
   wherein a ratio of tensile strength in a weld portion of the cage to tensile strength in a portion other than said weld portion is 0.8 or greater, said weld portion being formed at a region at which the flows of said magnesium alloy are merged during said injection molding.

2. The cage according to claim 1, wherein when observing the cross sectional surface of the cage, the ratio of the α phase having a grain size of 20 μm or greater is less than 5% in said magnesium alloy.

3. The cage according to claim 1, wherein when observing the cross sectional surface of the cage, no α phase having a grain size of 20 μm or greater is contained in said magnesium alloy.

4. The cage according to claim 1, wherein the cage is comb-shaped.

5. The cage according to claim 1, wherein the cage has a surface provided with a cation electrodeposition coating layer having a thickness of 15 μm or smaller.

6. The cage according to claim 1, wherein said magnesium alloy constituting the cage has an average crystal grain size of 10 μm or smaller.

7. The cage according to claim 1, wherein said magnesium alloy constituting the cage has an average crystal grain size of 5 μm or smaller.

8. The cage according to claim 1, wherein said magnesium alloy constituting the cage is age hardened.

9. A rolling bearing comprising:
   a raceway member;
   a plurality of rolling elements arranged in contact with said raceway member; and
   a cage rollably holding said rolling elements,
   the cage being the cage recited in claim 1.

10. The rolling bearing according to claim 9, wherein the rolling bearing is used to rotatably support a main shaft of a machine tool relative to a member disposed opposite to said main shaft.

11. A cage holding a rolling element in a rolling bearing, comprising:
    the cage being made of a magnesium alloy,
    the cage being molded by injection molding,
    the cage not having a confluence region including a void formed by merging of flows of said magnesium alloy including a liquid phase,
    wherein in a cross sectional surface of the cage, an area ratio of an α phase having a grain size of 20 μm or greater being less than 15% in said magnesium alloy, and
    wherein the cage has a surface provided with an anodized layer having a thickness of 15 μm or smaller.

12. The cage according to claim 11, wherein when observing the cross sectional surface of the cage, the ratio of the α phase having a grain size of 20 μm or greater is less than 5% in said magnesium alloy.

13. The cage according to claim 11, wherein when observing the cross sectional surface of the cage, no α phase having a grain size of 20 μm or greater is contained in said magnesium alloy.

14. The cage according to claim 11, wherein the cage is comb-shaped.

15. The cage according to claim 11, wherein said magnesium alloy constituting the cage has an average crystal grain size of 10 μm or smaller.

16. The cage according to claim 11, wherein said magnesium alloy constituting the cage has an average crystal grain size of 5 μm or smaller.

17. The cage according to claim 11, wherein said magnesium alloy constituting the cage is age hardened.

18. A rolling bearing comprising:
   a raceway member;
   a plurality of rolling elements arranged in contact with said raceway member; and
   a cage rollably holding said rolling elements,
   the cage being the cage recited in claim 11.

19. The rolling bearing according to claim 18, wherein the rolling bearing is used to rotatably support a main shaft of a machine tool relative to a member disposed opposite to said main shaft.

* * * * *